United States Patent
Son et al.

(10) Patent No.: US 9,081,637 B2
(45) Date of Patent: Jul. 14, 2015

(54) SYSTEM AND METHOD FOR A SOFTWARE PRODUCT MANAGER

(75) Inventors: Kyoung-Ho Son, Suwon-si (KR); Ja-Gun Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 12/753,434

(22) Filed: Apr. 2, 2010

(65) Prior Publication Data

US 2010/0192127 A1 Jul. 29, 2010

Related U.S. Application Data

(63) Continuation of application No. PCT/KR2008/001532, filed on Mar. 19, 2008.

(30) Foreign Application Priority Data

Oct. 4, 2007 (KR) .................. 10-2007-0099917

(51) Int. Cl.
*G06F 9/445* (2006.01)
*G06F 9/44* (2006.01)

(52) U.S. Cl.
CPC .. *G06F 8/61* (2013.01); *G06F 8/36* (2013.01); *G06F 8/71* (2013.01); *G06F 9/44505* (2013.01)

(58) Field of Classification Search
None
See application file for complete search history.

(56) References Cited

U.S. PATENT DOCUMENTS

| 5,530,869 | A  | * | 6/1996 | Salle | 717/113 |
| 6,487,713 | B1 | * | 11/2002 | Cohen et al. | 717/105 |
| 6,948,169 | B1 | * | 9/2005 | Amro et al. | 717/178 |
| 7,552,450 | B1 | * | 6/2009 | Evans et al. | 719/328 |
| 7,770,151 | B2 | * | 8/2010 | Sanjar et al. | 717/109 |
| 8,099,713 | B2 | * | 1/2012 | Becker et al. | 717/115 |
| 8,359,566 | B2 | * | 1/2013 | Chaar et al. | 717/101 |
| 8,392,873 | B2 | * | 3/2013 | Agrawal et al. | 717/104 |
| 8,875,118 | B1 | * | 10/2014 | Groothius et al. | 717/170 |
| 2004/0093593 | A1 | | 5/2004 | Jhanwar et al. | |
| 2005/0144619 | A1 | * | 6/2005 | Newman | 717/177 |

(Continued)

FOREIGN PATENT DOCUMENTS

KR 10-2006-0068162 6/2006
KR 10-2006-0070611 6/2006

(Continued)

OTHER PUBLICATIONS

Bosch et al., "Variability Issues in Software Product Lines," 2002, Software Product-Family Engineering Lecture Notes in Computer Science, vol. 2290, 2002, pp. 13-21.*
Metzger et al., "Variability Management in Software Product Line Engineering," 2007, Companion to the proceedings of the 29th International Conference on Software Engineering, pp. 186-187.*
Matinlassi, "Comparison of Software Product Line Architecture Design Methods: COPA, FAST, FORM, KobrA and QADA," 2004, Proceedings of the 26th International Conference on Software Engineering, pp. 127-136.*
International Search Report issued on Jun. 16, 2008, in corresponding PCT Application No. PCT/KR2008/001532 (10 pages).
Korean Notice of Allowance issued on Nov. 28, 2014 in Korean Application No. KR 10-2007-0099917 (5 pages, in Korean).

*Primary Examiner* — Thuy Dao
*Assistant Examiner* — Stephen Berman
(74) *Attorney, Agent, or Firm* — NSIP Law

(57) ABSTRACT

A component-based software product manager system and method are provided. Various software products for electronic appliances include common components that are shared there between and variable components that are not commonly shared there between and instead are exclusive to individual products. The component-based software product manager system and method combine and associate components with one another while managing a large-scale software asset in units of the components. The system and method described herein improve the cooperation and the reusability of software products.

6 Claims, 25 Drawing Sheets

(56) References Cited

U.S. PATENT DOCUMENTS

| | | |
|---|---|---|
| 2006/0004766 A1 | 1/2006 | Merkin |
| 2006/0142989 A1* | 6/2006 | Ramanathan et al. ........... 703/22 |
| 2006/0161895 A1* | 7/2006 | Speeter et al. ................. 717/121 |
| 2006/0161906 A1* | 7/2006 | Becker et al. ................. 717/139 |
| 2006/0230314 A1* | 10/2006 | Sanjar et al. .................... 714/26 |
| 2006/0253849 A1* | 11/2006 | Avram et al. ................. 717/172 |
| 2007/0226343 A1* | 9/2007 | Bishop ........................... 709/226 |
| 2007/0234345 A1* | 10/2007 | Kramer et al. ................ 717/174 |
| 2007/0261028 A1* | 11/2007 | Schenk et al. ................ 717/121 |
| 2008/0016466 A1* | 1/2008 | Grasser et al. ................ 715/835 |
| 2008/0022275 A1* | 1/2008 | Herrmann ..................... 717/175 |
| 2008/0320497 A1* | 12/2008 | Tarkoma et al. .............. 719/319 |
| 2009/0013162 A1* | 1/2009 | Nandan et al. .................... 713/1 |

FOREIGN PATENT DOCUMENTS

| | | | |
|---|---|---|---|
| KR | 10-2007-0000732 A | 1/2007 | |
| WO | WO 2007/001108 | 1/2007 | |
| WO | WO2007/001108 * | 1/2007 | ................ G06F 9/44 |
| WO | WO 2007/001108 A1 | 1/2007 | |

\* cited by examiner

FIG. 2
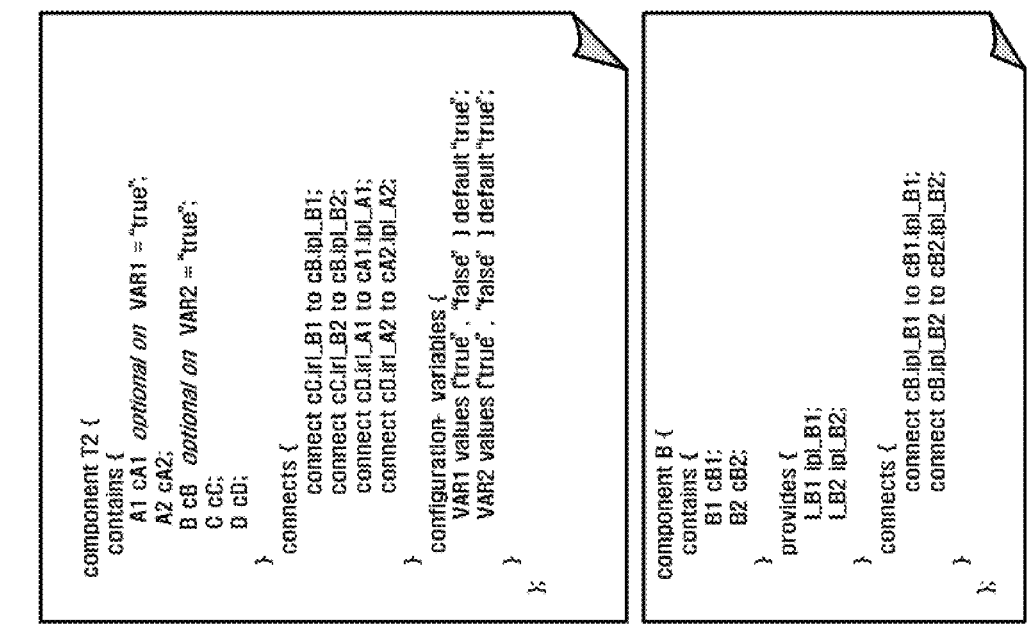
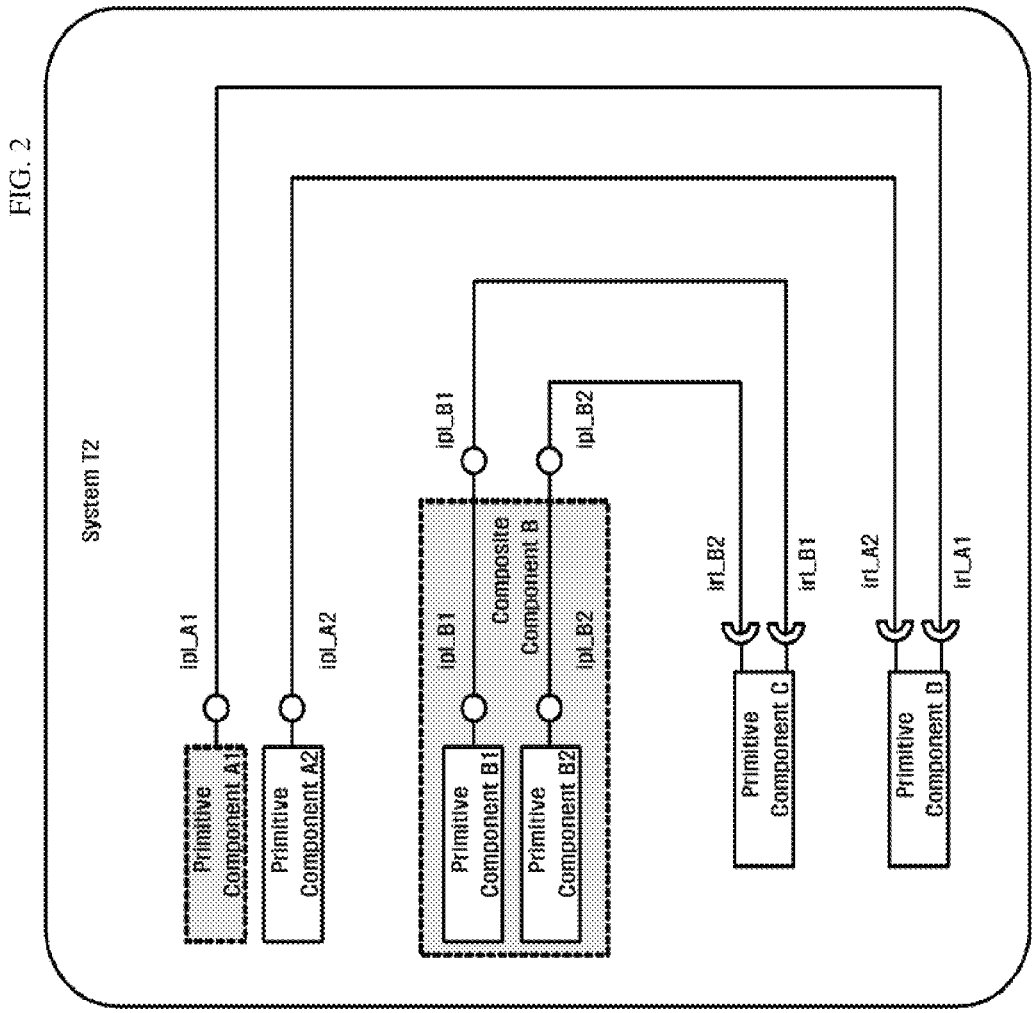

FIG. 3
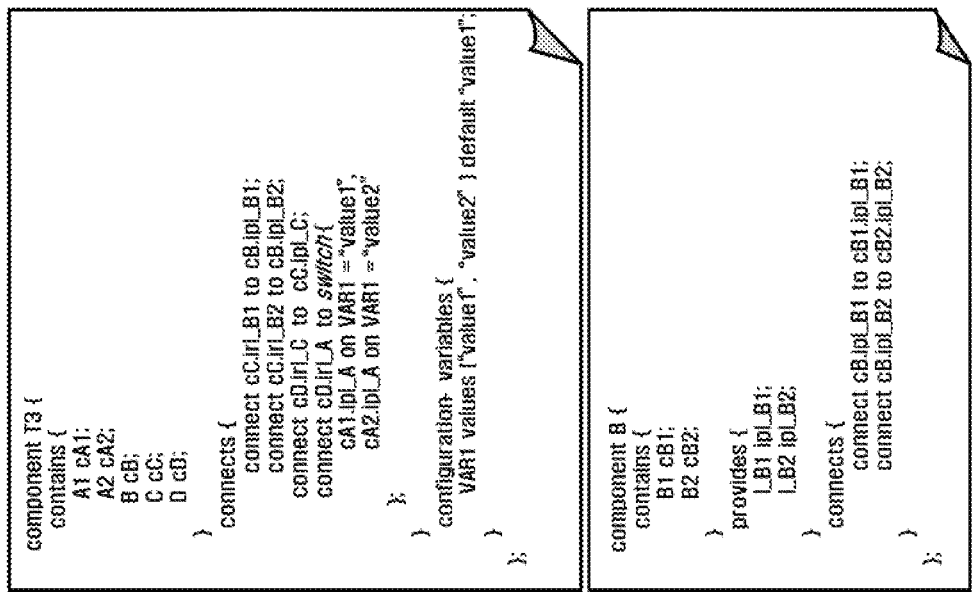
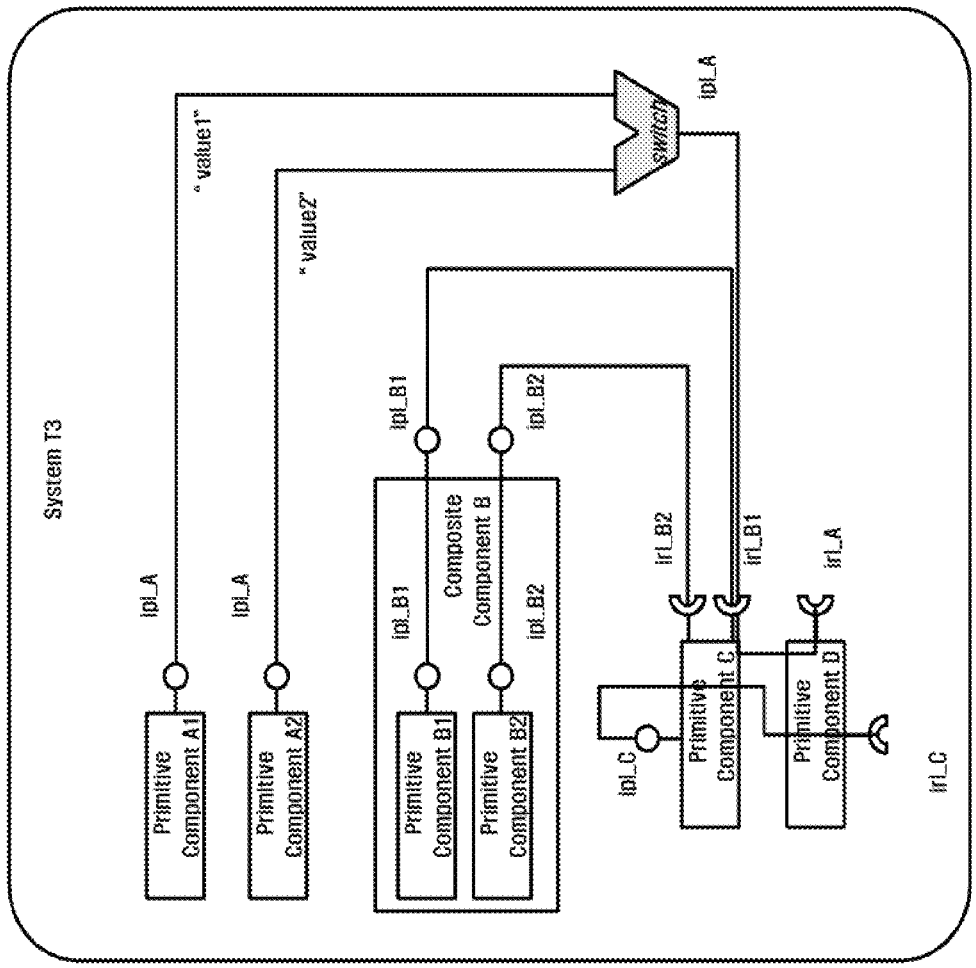

FIG. 7

```
component A {
  contains {
    A1 cA1    optional/ on    A_VAR1 = "off";
    A2 cA2    optional/ on    A_VAR2 = "off";
  }
  provides {
    LA1 ipLA1;
    LA2 ipLA2;
  }
  configuration- variables {
    A_VAR1 values { "off", "on" };
    A_VAR2 values { "off", "on" };
  }
};
```

```
component B {
  contains {
    B1 cB1    optional/ on    B_VAR1 = "off";
    B2 cB2    optional/ on    B_VAR2 = "off";
    B3 cB3    optional/ on    B_VAR3 = "off";
  }
  provides {
    LB1 ipLB1;
    LB2 ipLB2;
    LB3 ipLB3;
  }
  configuration- variables {
    B_VAR1 values { "off", "on" };
    B_VAR2 values { "off", "on" };
    B_VAR3 values { "off", "on" };
  }
};
```

```
component T6 {
  contains {
    A cA;
    B cB;
  }
  provides {
    LA1 ipLA1;
    LA2 ipLA2;
    LB1 ipLB1;
    LB2 ipLB2;
    LB3 ipLB3;
  }
  connects {
    connect cA.ipLA1 to ipLA1;
    connect cA.ipLA2 to ipLA2;
    connect cB.ipLB1 to ipLB1;
    connect cB.ipLB2 to ipLB2;
    connect cB.ipLB3 to ipLB3;
  }
  configuration- variables {
    T6_VAR1 represents cA.A_VAR1;
    T6_VAR2 represents cA.A_VAR2;
    T6_VAR3 represents cB.B_VAR1;
    T6_VAR4 represents cB.B_VAR2;
    T6_VAR5 represents cB.B_VAR3;
  }
};
```

FIG. 8

```
component A {
  contains {
    A1 cA1    optional on    A_VAR1 = 'bff';
    A2 cA2    optional on    A_VAR2 = 'bff';
  }
  provides {
    LA1 ipLA1;
    LA2 ipLA2;
  }
  configuration- variables {
    A_VAR1 values {'bff', 'bff'};
    A_VAR2 values {'bff', 'bff'};
  }
};
```

```
component B {
  contains {
    B1 cB1    optional on    B_VAR1 = 'bff';
    B2 cB2    optional on    B_VAR2 = 'bff';
    B3 cB3    optional on    B_VAR3 = 'bff';
  }
  provides {
    LB1 ipLB1;
    LB2 ipLB2;
    LB3 ipLB3;
  }
  configuration- variables {
    B_VAR1 values {'bff', 'bff'};
    B_VAR2 values {'bff', 'bff'};
    B_VAR3 values {'bff', 'bff'};
  }
};
```

```
component T7 {
  contains {
    A cA;
    B cB;
  }
  provides {
    LA1 ipLA1;
    LA2 ipLA2;
    LB1 ipLB1;
    LB2 ipLB2;
    LB3 ipLB3;
  }
  connects {
    connect cA.ipLA1 to ipLA1;
    connect cA.ipLA2 to ipLA2;
    connect cB.ipLB1 to ipLB1;
    connect cB.ipLB2 to ipLB2;
    connect cB.ipLB3 to ipLB3;
  }
  configuration- variables {
    T7_VAR1 represents    {cA.A_VAR1, cA.A_VAR2};
    T7_VAR2 represents    {cB.B_VAR1, cB.B_VAR2, cB.B_VAR3};
  }
};
```

FIG. 9

```
component A {
  contains {
    A1 cA1    optional on    A_VAR1 = 'on';
    A2 cA2    optional on    A_VAR2 = 'on';
  }
  provides {
    LA1 ipLA1;
    LA2 ipLA2;
  }
  configuration- variables {
    A_VAR1 values { 'on' , 'off' };
    A_VAR2 values { 'on' , 'off' };
  }
};
```

```
component B {
  contains {
    B1 cB1    optional on    B_VAR1 = 'on';
    B2 cB2    optional on    B_VAR2 = 'on';
    B3 cB3    optional on    B_VAR3 = 'on';
  }
  provides {
    LB1 ipLB1;
    LB2 ipLB2;
    LB3 ipLB3;
  }
  configuration- variables {
    B_VAR1 values { 'on' , 'off' };
    B_VAR2 values { 'on' , 'off' };
    B_VAR3 values { 'on' , 'off' };
  }
};
```

```
component T8 {
  contains {
    A cA;
    B cB;
  }
  provides {
    LA1 ipLA1;
    LA2 ipLA2;
    LB1 ipLB1;
    LB2 ipLB2;
    LB3 ipLB3;
  }
  connects {
    connect cA/ipLA1 to ipLA1;
    connect cA/ipLA2 to ipLA2;
    connect cB/ipLB1 to ipLB1;
    connect cB/ipLB2 to ipLB2;
    connect cB/ipLB3 to ipLB3;
  }
  configuration- variables {
    T8_VAR1 values {
      "type1" represents    {cA.A_VAR1 = 'on'    , cA.A_VAR2 = 'on'   },
      "type2" represents    {cA.A_VAR1 = 'on'    , cA.A_VAR2 = 'off'  }};
    T8_VAR2 values {
      "type1" represents    {cB.B_VAR1 = 'on'    , cB.B_VAR2 = 'on'   , cB.B_VAR3 = 'on'  },
      "type2" represents    {cB.B_VAR1 = 'on'    , cB.B_VAR2 = 'on'   , cB.B_VAR3 = 'off' },
      "type3" represents    {cB.B_VAR1 = 'on'    , cB.B_VAR2 = 'off'  , cB.B_VAR3 = 'off' },
      "type4" represents    {cB.B_VAR1 = 'off'   , cB.B_VAR2 = 'off'  , cB.B_VAR3 = 'off' }};
  }
};
```

FIG. 12

| No. | FEATURE LIST | PRODUCTS | | | |
|---|---|---|---|---|---|
| | FEATURE DESCRIPTION | T1 | T2 | T3 | T4 |
| F01 | Support DMB TUNER | on | off | on | off |
| F02 | Support DMB signal of Satellite | on | off | on | off |
| F03 | Support DMB signal of Terrestrial | off | off | off | off |
| F04 | Support BLUETOOTH | off | off | on | on |
| F05 | Support DMB VIEWER | on | off | on | off |
| F06 | Support BOOK READER | off | off | on | on |
| F07 | Support LYRICS VIEWER | off | off | on | on |
| F08 | Support MOVIE VIEWER | on | on | on | on |
| F09 | Support PHOTO VIEWER | on | on | off | on |
| F10 | Support RADIO | on | off | on | on |
| F11 | Support VOICE RECORDER | off | on | on | on |
| F12 | Support AUDIO ENCODER | off | on | on | on |
| F13 | Support FLASH | off | off | off | on |
| F14 | Support AUDIO DECODER | on | on | on | on |
| F15 | Support MP3 AUDIO CODEC | on | on | on | on |
| F16 | Support WMA AUDIO CODEC | on | on | on | on |
| F17 | Support OGG AUDIO CODEC | on | off | on | on |
| F18 | Support VIDEO DECODER | on | on | off | on |
| F19 | Support MPG VIDEO CODEC | on | on | off | on |
| F20 | Support WMV VIDEO CODEC | on | off | on | on |
| F21 | Support DIVX VIDEO CODEC | off | on | on | off |
| F22 | Support AUDIO ENCODER | on | on | on | on |
| F23 | Support ENGLISH LANGUAGE | on | off | on | on |
| F24 | Support CHINESE LANGUAGE | off | off | on | off |
| F25 | Support FRENCH LANGUAGE | off | on | on | off |
| F26 | Support KOREAN LANGUAGE | on | off | off | on |

FIG. 13

| No. | COMPONENT LEVEL | COMPONENT NAME | CONFIGURATION VARIABLE | FEATURE MAP NO. [Product] | T1 | T2 | T3 | T4 |
|---|---|---|---|---|---|---|---|---|
| | | | | | | | PRODUCTS | |
| CV01 | root composite | MP3P | DEVICE_TYPE | F01 | on | off | on | off |
| CV02 | | HAL | DMB_SUPPORT | F02,F03 | T | none | S | none |
| CV03 | | | DMB_TYPE | F04 | off | off | off | on |
| CV04 | | | BLUETOOTH_SUPPORT | F05 | on | off | on | off |
| CV05 | 1st level composite | | DMB_VIEWER_SUPPORT | F06 | off | off | on | off |
| CV06 | | | BOOK_READER_SUPPORT | F07 | off | off | on | on |
| CV07 | | MP3PAPP | LYRICS_VIEWER_SUPPORT | F08 | on | on | off | on |
| CV08 | | | MOVIE_VIEWER_SUPPORT | F09 | on | on | off | on |
| CV09 | | | PHOTO_VIEWER_SUPPORT | F10 | on | off | on | on |
| CV10 | | | RADIO_SUPPORT | F11 | off | off | on | on |
| CV11 | | | VOICE_RECORDER_SUPPORT | F12 | off | on | on | on |
| CV12 | | MP3PMW | AVMS_AUDIO_ENCODER_SUPPORT | F15,F16,F17 | high | low | high | high |
| CV13 | | | AVMS_AUDIO_SET | F19,F20,F21 | high | none | none | low |
| CV14 | | | AVMS_VIDEO_SET | F13 | off | off | off | on |
| CV15 | | | GWES_LANGUAGE_SET | F23,F24,F25,F26 | domestic | europe | global | domestic |
| CV16 | | AVMS | AUDIO_DECODER_SUPPORT | F14 | on | on | on | on |
| CV17 | | | AUDIO_CODEC_MP3_SUPPORT | F15 | on | on | on | on |
| CV18 | | | AUDIO_CODEC_WMA_SUPPORT | F16 | on | off | high | on |
| CV19 | 2nd level composite | | AUDIO_CODEC_OGG_SUPPORT | F17 | on | off | on | on |
| CV20 | | | VIDEO_DECODER_SUPPORT | F18 | on | on | on | on |
| CV21 | | | VIDEO_CODEC_MPG_SUPPORT | F19 | on | off | off | off |
| CV22 | | | VIDEO_CODEC_WMV_SUPPORT | F20 | off | off | off | off |
| CV23 | | | VIDEO_CODEC_DIVX_SUPPORT | F21 | on | off | off | off |
| CV24 | | | AUDIO_ENCODER_SUPPORT | F22 | off | off | off | off |
| CV25 | | GWES | LANGUAGE_EN_SUPPORT | F23 | on | on | on | on |
| CV26 | | | LANGUAGE_CN_SUPPORT | F24 | on | off | on | off |
| CV27 | | | LANGUAGE_FR_SUPPORT | F25 | off | off | off | off |
| CV28 | | | LANGUAGE_KR_SUPPORT | F26 | off | off | off | off |
| CV29 | | | FLASH_SUPPORT | F13 | on | off | off | on |
| CV30 | | | | | off | off | on | on |

FIG. 14

| No. | SOURCE ID | BLC NAME | LOCATION | FLC NAME | USABILITY |
|---|---|---|---|---|---|
| BLC001 | BLCdbes23ts532adf234nv01 | B_AdminPanel | Server1/src/MP3/AdminPanel | AdminPanel | unlocked |
| BLC002 | BLCdbes23ts532adf234nv02 | B_BookReader_ver1 | Server1/src/MP3/BookReader_v1 | BookReader | unlocked |
| BLC003 | BLCdbes23ts532adf234nv03 | B_BookReader_ver2 | Server1/src/MP3/BookReader_v2 | | unlocked |
| BLC004 | BLCdbes23ts532adf234nv04 | B_Clock | Server1/src/MP3/Clock | Clock | unlocked |
| BLC005 | BLCdbes23ts532adf234nv05 | B_ContentsManager | Server1/src/MP3/ContentsManager | ContentsManager | unlocked |
| BLC006 | BLCdbes23ts532adf234nv06 | B_CommunicationManager | Server1/src/MP3/CommunicationManager | CommunicationManager | unlocked |
| BLC007 | BLCdbes23ts532adf234nv07 | B_DMBViewer | Server1/src/MP3/DMBViewer | DMBViewer | unlocked |
| BLC008 | BLCdbes23ts532adf234nv08 | B_LyricsViewer | Server1/src/MP3/LyricsViewer | LyricsViewer | unlocked |
| BLC009 | BLCdbes23ts532adf234nv09 | B_Menu | Server1/src/MP3/Menu | Menu | unlocked |
| BLC010 | BLCdbes23ts532adf234nv10 | B_MovieViewer | Server1/src/MP3/MovieViewer | MovieViewer | unlocked |
| BLC011 | BLCdbes23ts532adf234nv11 | B_MusicPlayer_ver1 | Server1/src/MP3/MusicPlayer_v1 | MusicPlayer | *locked* |
| BLC012 | BLCdbes23ts532adf234nv12 | B_MusicPlayer_ver2 | Server1/src/MP3/MusicPlayer_v2 | | unlocked |
| BLC013 | BLCdbes23ts532adf234nv13 | B_MusicPlayer_ver3 | Server1/src/MP3/MusicPlayer_v3 | | unlocked |
| BLC014 | BLCdbes23ts532adf234nv14 | B_PhotoViewer | Server1/src/MP3/PhotoViewer | PhotoViewer | unlocked |
| BLC015 | BLCdbes23ts532adf234nv15 | B_Radio | Server1/src/MP3/Radio | Radio | unlocked |
| BLC016 | BLCdbes23ts532adf234nv16 | B_Scheduler | Server1/src/MP3/Scheduler | Scheduler | unlocked |
| BLC017 | BLCdbes23ts532adf234nv17 | B_VoiceRecorder | Server1/src/MP3/VoiceRecorder | VoiceRecorder | unlocked |
| BLC018 | BLCdbes23ts532adf234nv18 | B_AccountMgmt | Server1/src/MP3/AccountMgmt | AccountMgmt | unlocked |
| BLC019 | BLCdbes23ts532adf234nv19 | B_StorageMgmt_ver1 | Server1/src/MP3/StorageMgmt_v1 | StorageMgmt | unlocked |
| BLC020 | BLCdbes23ts532adf234nv20 | B_StorageMgmt_ver2 | Server1/src/MP3/StorageMgmt_v2 | | unlocked |
| BLC021 | BLCdbes23ts532adf234nv21 | B_SystemMgmt | Server1/src/MP3/SystemMgmt | SystemMgmt | unlocked |
| BLC022 | BLCdbes23ts532adf234nv22 | B_Flash | Server1/src/MP3/Flash | Flash | *locked* |
| BLC023 | BLCdbes23ts532adf234nv23 | B_Fonts | Server1/src/MP3/Fonts | Fonts | unlocked |
| BLC024 | BLCdbes23ts532adf234nv24 | B_Graphics | Server1/src/MP3/Graphics | Graphics | unlocked |
| BLC025 | BLCdbes23ts532adf234nv25 | B_Language | Server1/src/MP3/Language | Language | unlocked |
| BLC026 | BLCdbes23ts532adf234nv26 | B_Language_CN | Server1/src/MP3/Language_CN | Language_CN | unlocked |
| BLC027 | BLCdbes23ts532adf234nv27 | B_Language_EN | Server1/src/MP3/Language_EN | Language_EN | unlocked |
| BLC028 | BLCdbes23ts532adf234nv28 | B_Language_FR | Server1/src/MP3/Language_FR | Language_FR | unlocked |
| BLC029 | BLCdbes23ts532adf234nv29 | B_Language_KR | Server1/src/MP3/Language_KR | Language_KR | unlocked |
| BLC030 | BLCdbes23ts532adf234nv30 | B_ProtocolAdapter | Server1/src/MP3/ProtocolAdapter | ProtocolAdapter | unlocked |
| ... | ... | ... | ... | ... | ... |

FIG. 15

```
product T1 derived from MP3P {
    configuration - settings {
        MP3P.DEVICE_TYPE = "T1";
    }
    mappings {
        MP3P.cMP3PAPP.cAdminPanel  uses  B_AdminPanel;
        MP3P.cMP3PAPP.cBookReader  uses  B_BookReader_ver1;
        ...
    }
};

product T2 derived from MP3P {
    configuration - settings {
        MP3P.DEVICE_TYPE = "T2";
    }
    mappings {
        MP3P.cMP3PAPP.cAdminPanel  uses  B_AdminPanel;
        MP3P.cMP3PAPP.cBookReader  uses  B_BookReader_ver2;
        ...
    }
};
...
```

FIG. 16

```
product T1 derived from MP3P {
  configuration-settings{
    MP3P.MP3PAPP_       DMB_SUPPORT = "on";
    MP3P.MP3PAPP_       DMB_TYPE = "T";
    MP3P.MP3PAPP_       BLUETOOTH_SUPPORT = "off";
    MP3P.MP3PAPP_       DMB_VIEWER_SUPPORT = "on";
    MP3P.MP3PAPP_       BOOK_READER_SUPPORT = "off";
    MP3P.MP3PAPP_       LYRICS_VIEWER_SUPPORT = "off";
    MP3P.MP3PAPP_       MOVIE_VIEWER_SUPPORT = "on";
    MP3P.MP3PAPP_       PHOTO_VIEWER_SUPPORT = "on";
    MP3P.MP3PAPP_       RADIO_SUPPORT = "on";
    MP3P.MP3PAPP_       VOICE_RECORDER_SUPPORT = "off";
    MP3P.MP3PMW_AV      MS_AUDIO_ENCODER_SUPPORT = "off";
    MP3P.MP3PMW_AV      MS_AUDIO_SET = "high";
    MP3P.MP3PMW_AV      MS_VIDEO_SET = "high";
    MP3P.MP3PMW         GWES_FLASH_SUPPORT = "off";
    MP3P.MP3PMW_GWES    LANGUAGE_SET = "domestic";
  }
  mappings{
    MP3P.cMP3PAPP.cAdminPanel uses B_AdminPanel
    MP3P.cMP3PAPP.cBookReader uses B_BookReader_ver1;
    ...
  };
}
```

```
product T2 derived from MP3P {
  configuration-settings{
    MP3P.MP3PAPP_       DMB_SUPPORT = "off";
    MP3P.MP3PAPP_       DMB_TYPE = "none";
    MP3P.MP3PAPP_       BLUETOOTH_SUPPORT = "off";
    MP3P.MP3PAPP_       DMB_VIEWER_SUPPORT = "off";
    MP3P.MP3PAPP_       BOOK_READER_SUPPORT = "off";
    MP3P.MP3PAPP_       LYRICS_VIEWER_SUPPORT = "off";
    MP3P.MP3PAPP_       MOVIE_VIEWER_SUPPORT = "off";
    MP3P.MP3PAPP_       PHOTO_VIEWER_SUPPORT = "on";
    MP3P.MP3PAPP_       RADIO_SUPPORT = "on";
    MP3P.MP3PAPP_       VOICE_RECORDER_SUPPORT = "on";
    MP3P.MP3PMW_AV      MS_AUDIO_ENCODER_SUPPORT = "off";
    MP3P.MP3PMW_AV      MS_AUDIO_SET = "low";
    MP3P.MP3PMW_AV      MS_VIDEO_SET = "none";
    MP3P.MP3PMW         GWES_FLASH_SUPPORT = "off";
    MP3P.MP3PMW_GWES    LANGUAGE_SET = "europe";
  }
  mappings{
    MP3P.cMP3PAPP.cAdminPanel uses B_AdminPanel
    MP3P.cMP3PAPP.cBookReader uses B_BookReader_ver2;
    ...
  };
}
```

FIG. 24

| DEVICE_TYPE | T1 | T2 | T3 | T4 | Primitive component | Composite component |
|---|---|---|---|---|---|---|
| DMB_VIEWER_SUPPORT | v | | v | | DMBViewer | MP3PAPP |
| DMB_TYPE | T | | S | | Tuner | HAL |
| RADIO_SUPPORT | v | | v | v | Radio | MP3PAPP |
| PHOTO_VIEWER_SUPPORT | v | v | | v | PhotoViewer | MP3PAPP |
| MOVIE_VIEWER_SUPPORT | v | | | v | MovieViewer | MP3PAPP |
| LYRICS_VIEWER_SUPPORT | | | v | v | LyricsViewer | MP3PAPP |
| BOOK_READER_SUPPORT | | | v | | BOOKReader | MP3PAPP |
| BLUETOOTH_SUPPORT | | | | v | Bluetooth | HAL |
| FLASH_SUPPORT | | | | v | Flash | GWES |
| VOICE_RECORDER_SUPPORT | | v | v | v | VoiceRecorder | MP3PAPP |
| AUDIO_CODEC | MP3 OGG WMA | MP3 OGG | MP3 OGG WMA | MP3 OGG WMA | AudioDecoder | AVMS |
| VIDEO_CODEC | MP3 AVI WMV | | | MPG | VideoDecoder | AVMS |
| LANGUAGE | EN KR | EN FR | EN FR KR CN | EN KR | Language | GWES |

SYSTEM AND METHOD FOR A SOFTWARE PRODUCT MANAGER

CROSS-REFERENCE TO RELATED APPLICATION(S)

This application is a continuation of International Application PCT/KR2008/001532, filed on Mar. 19, 2008, which claims the benefit of Korean Patent Application No. 10-2007-0099917, filed on Oct. 4, 2007, in the Korean Intellectual Property Office, the entire disclosures of each of which are incorporated herein by reference for all purposes.

BACKGROUND

1. Field

The following description relates to a component-based software product manager system and method, and more particularly, to a software product manager system and method in which a software product line (SPL) is operated based on a component model.

2. Description of Related Art

Software products used to be considered simply as auxiliary parts for the functions of hardware devices in the field of electronic appliances, but are now considered elements that implement the main functions of hardware devices. Due to the recent trend to diversify the functions of a line of products, the importance of software products has become comparable to that of hardware products.

In the field of electronic appliances, software systems are often designed to include common components for the purpose of operating various types of devices. Because a line of products may be designed to provide different functions, it is necessary for software developers not only to develop various software components and also to effectively manage software components to improve the efficiency of the development of software products.

In addition, it is desirable to reuse software components by storing the software components in a repository or a library set. Also it is desirable to develop a software development system such as a software product line (SPL) by reflecting the connections between various components and the variability between product types using the architecture of a software platform.

For example, SPL indicates a system for managing features that are commonly shared throughout a certain market or between a certain line of products, and developing various products based on the variable attributes. Research has been conducted on the application of SPL not only to process management for hardware products but also to software, for example, software based on Component-Based Software Development (CBSD).

A software product includes a combination of components that are selected from a software platform having common components and variable components, based on certain requirements. Thus, various types of software products may share common elements and may be classified into the same product group. Accordingly, SPL may be interpreted as a system for managing and configuring software components and for developing various products based on a software product.

A software platform includes common components that may be applied to a group of products and variable components that are selectively applied to the group of products. Components are selected from a software platform based on predetermined product settings. Additional development processes are performed using the selected components, thereby producing new products and expanding product lines. The new products and the expanded product lines may be used to expand the software platform.

To establish a system capable of operating the SPL, software asset list management, mutual dependency management, and variable point management must be performed. Also, a tool for supporting these management processes may be used.

In general, developing a software product includes representing the architecture of a software system based on a Unified Modeling Language (UML) and describing the logic that implements the software system architecture.

UML refers to a software modeling standard adopted in November 1997 by the Object Management Group (OMG) for the purpose of expressing object-oriented analysis and design decisions. Using UML, it is possible to mediate disagreements that may arise between software developers during the analysis of requirements, the design of a system, and/or the implementation of a system.

Because UML provides an effective modeling tool and has a logical system of notation with a relatively few inconsistencies, it is possible to facilitate communication between software developers and the detection of modeling structures that are missing or inconsistent. In addition, UML may be used regardless of the scale of a system to be developed.

SUMMARY

In one general aspect, there is provided a component-based software product manager system including a software product manager module which manages a list of features of a software product, a software platform manager module which manages a list of components corresponding to the features of the software product, a software platform configurator module which sets configuration variables of the components to predetermined setting values, and a software asset manager module which synchronizes element variables, based on configuration variable settings, and which manages physical elements.

The component-based software product manager system may further include a product configuration language descriptor module which describes the predetermined setting values to which the configuration variables are respectively set by the software platform configurator module.

The component-based software product manager system may further include a component manager module which maintains a component model and which manages modifications, if any, to the component model, a component language descriptor module which handles a component description language that describes configuration information of the components and the definitions of variables corresponding to variable points, and a variable point configurator module which synchronizes the variable points with the element variables.

The components may include function-level components (FLCs) and build-level components (BLCs), the software platform manager module may manage information regarding associations between the FLCs and the BLCs, and the software asset manager module may provide the BLCs.

The element variables may be one-to-one mapped to the configuration variables so that configuration propagation can be performed.

The configuration variables may be classified into high-level configuration variables and low-level configuration variables by variability delegation.

The high-level configuration variables may be one-to-n mapped to the low-level configuration variables, based on variability delegation relationships between the components.

The variable points may include "OPTION" for determining whether to include a component and "SWITCH" for selecting an interface.

In another aspect, there is provided a component-based software product manager method including adding a new product, configuring a set of features corresponding to the new product, configuring a set of configuration variables for the new product based on the feature set, configuring a set of components corresponding to the configuration variables, and configuring a set of element variables based on the configured configuration variable set.

The configuring the element variable set may include synchronizing the variable points according to configuration variable settings and synchronizing the variable points with the element points.

The variable points may include "OPTION" for determining whether to include a component and "SWITCH" for selecting an interface.

The component-based software product manager method may further include determining whether the features corresponding to the new product exist in a feature list, and if the features corresponding to the new product do not exist in the list of features, expanding the feature set.

The component-based software product manager method may further include determining whether the components corresponding to the configuration variables exist in a component list, and if the components corresponding to the configuration variables do not exist in the component list, expanding the component set.

The element variables may be one-to-one mapped to the configuration variables so that configuration propagation can be performed.

The configuration variables may be classified into high-level configuration variables and low-level configuration variables by variability delegation.

The high-level configuration variables may be one-to-n mapped to the low-level configuration variables, based on variability delegation relationships between the components.

In another aspect, there is provided a component-based software product manager method including selecting a product, loading configuration settings regarding the selected product, determining one or more components based on the loaded configuration settings, and setting element variables by synchronizing the element variables based on the loaded configuration settings.

The determining of the component may include selecting BLCs that can be mapped to FLCs, based on the loaded configuration settings.

The component-based software product manager method may further include determining whether the BLCs are locked, and in response to the BLCs being locked, terminating configuration setting for the selected product.

The component-based software product manager method may further include determining whether the setting of all the element variables is completed.

The setting of the element variables may include synchronizing variable points based on the configuration variables and synchronizing the variable points with the element variables.

The variable points may include "OPTION" for determining whether to include a component and "SWITCH" for selecting an interface.

In another aspect, there is provided a component-based software product manager method including creating a syntax by associating a root composite component that represents a software platform architecture, determining whether setting values have been designated for all configuration variables included in the root composite component, updating the configuration variables, determining whether all FLCs have been mapped to corresponding BLCs according to the configuration variables, and updating mapping relationships between the FLCs and the BLCs.

The component-based software product manager method may further include, if there are configuration values for which setting values are yet to be designated, designating setting values to be allocated to a product by referencing a configuration variable list.

The component-based software product manager method may further include, if there are FLCs yet to be mapped to respective corresponding BLCs, designating one or more BLCs to be allocated to a product by referencing a FLC-to-BLC mapping table.

Other features and aspects may be apparent from the following description, the drawings, and the claims.

BRIEF DESCRIPTION THE OF DRAWINGS

FIGS. 1 and 2 are diagrams illustrating an example of applying a variable point "OPTION."

FIG. 3 is a diagram illustrating an example of applying a variable point "SWITCH."

FIGS. 7 and 8 are diagrams illustrating examples of variable-to-variable variability mapping.

FIG. 9 is a diagram illustrating an example of a variable-to-value variability mapping.

FIG. 12 is a table illustrating an example of a list of features and indicating which of the features are applied to each software product.

FIG. 13 is a table illustrating an example of a list of configuration variables that represent respective features in a component model.

FIG. 14 is a table illustrating an example of a list of build-level components (BLCs) that implement function-level components (FLCs).

FIGS. 15 and 16 are diagrams illustrating examples of configuration settings for an MP3 software platform.

FIG. 24 is an example of a configuration variable analysis table.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

Figure 1:
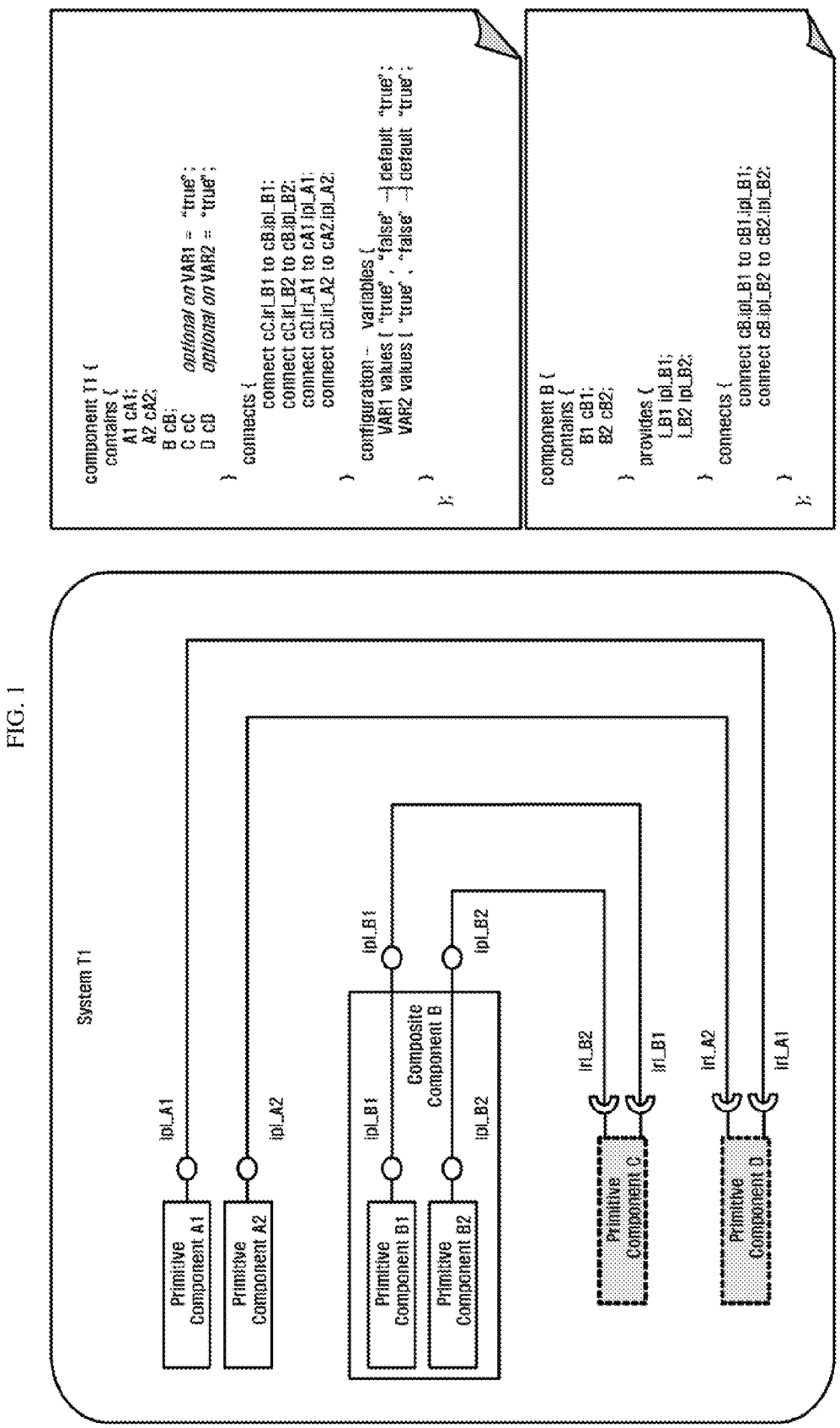

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

For ease of description, the terms frequently used in this description are given below.

Features correspond to requirements or the properties of a product. For example, features may include the requirements regarding the functional factors of a product, and the requirements regarding the non-functional factors of a product, such as performance and product quality, and the like.

Configuration variables correspond to variables that represent the variability of a software platform based on a component model. Configuration variables may be represented by the same names as variables used in physical code.

Element variables correspond to variables used in physical source code.

Variable points correspond to variable properties of a software product or points where such variable properties exist.

A software product includes, for example, physical source code, build scripts, data libraries, and the like. Components are functional units, rather than being physical units such as physical code files, scripts, directories, and the like. For example, several directories may constitute one component. Alternatively, a single source code may constitute a component.

Unit components are referred to as primitive components. For example, a composite component may be configured by combining a number of primitive components.

In describing the connection between the components, the functions provided by a component may be represented using a "provide" interface. If a component uses the functions of another component, a "require" interface may be used to represent the functions of the former component. In a component model, prefixes "ip" and "ir" may be used to differentiate a "provide" interface from a request interface, respectively.

A software product may be deemed an uppermost-level composite component having primitive components and composite components. Such an uppermost-level composite component is referred to as a root composite component.

CDL corresponds to one or more rules for describing components. Primitive components may be represented by "provide" interfaces or "require" interfaces, whereas composite components may be represented not only by "provide" interfaces or "require" interfaces, but also by the connections between sub-components thereof and configuration variable information.

"Provide" interfaces provided by primitive components may be used to describe the functions of the primitive components using an interface description language (IDL).

When function-level components (FLCs) are represented using CDL, actual implementation information regarding the function-level components may be represented using a build-level component (BLC) description language (BCDL). BCDL includes source code, libraries, and build information, and the like, that may be used for implementing components.

The development of a software product may be divided into two phases, a design phase and an implementation phase. FLCs correspond to components obtained in the design phase and are referred to as function-level components. BLCs correspond to components obtained in the implementation phase.

A basic structure for operating software product lines using a component model is described hereinafter.

FIGS. 1 through 4 illustrate examples of applying variable points in a component-based software product manager method.

In a component model, variable points are used to represent the variability of a component. For example, the variable points may include "OPTION" and "SWITCH."

FIGS. 1 and 2 illustrate examples of applying the variable point "OPTION." The variable point "OPTION" is used to determine whether to include a predetermined primitive component in a composite component. That is, the variable point "OPTION" is a variable for describing whether to include a predetermined primitive component in a software product.

Referring to FIG. 1, the variable point "OPTION" is applied to primitive components having a request interface for requesting the functions of other primitive components. The primitive components for which the variable point "OPTION" is set may be included in or excluded from a composite component.

Referring to FIG. 2, the variable point "OPTION" is set for primitive components having a "provide" interface. The variable point "OPTION" may be set implicitly for the primitive components having a "provide" interface. The variable point may be set by other primitive components which request the primitive components having a "provide" interface. A request interface that is not connected to any "provide" interface is assumed to be null. Thus, a component having a request interface that is not connected to any "provide" interface is the equivalent of the request interface not existing. Referring to FIGS. 1 and 2, primitive components for which the variable point "OPTION" is set are enclosed by dotted lines.

FIG. 3 illustrates an example of applying the variable point "SWITCH" for primitive components.

If there are two or more "provide" interfaces, the variable point "SWITCH" may be used to connect one of the "provide" interfaces to a request interface, according to settings.

Thus, for example, a "SWITCH" allows a plurality of components that implement the same function to implement that function in different manners. Also, it allows the plurality of components to be connected to the same request interface. In order to implicitly exclude components that are not selected by "SWITCH," provide components that are connected together by the variable point "SWITCH" may be treated as if the variable point "OPTION" were set for them.

Figure 4:
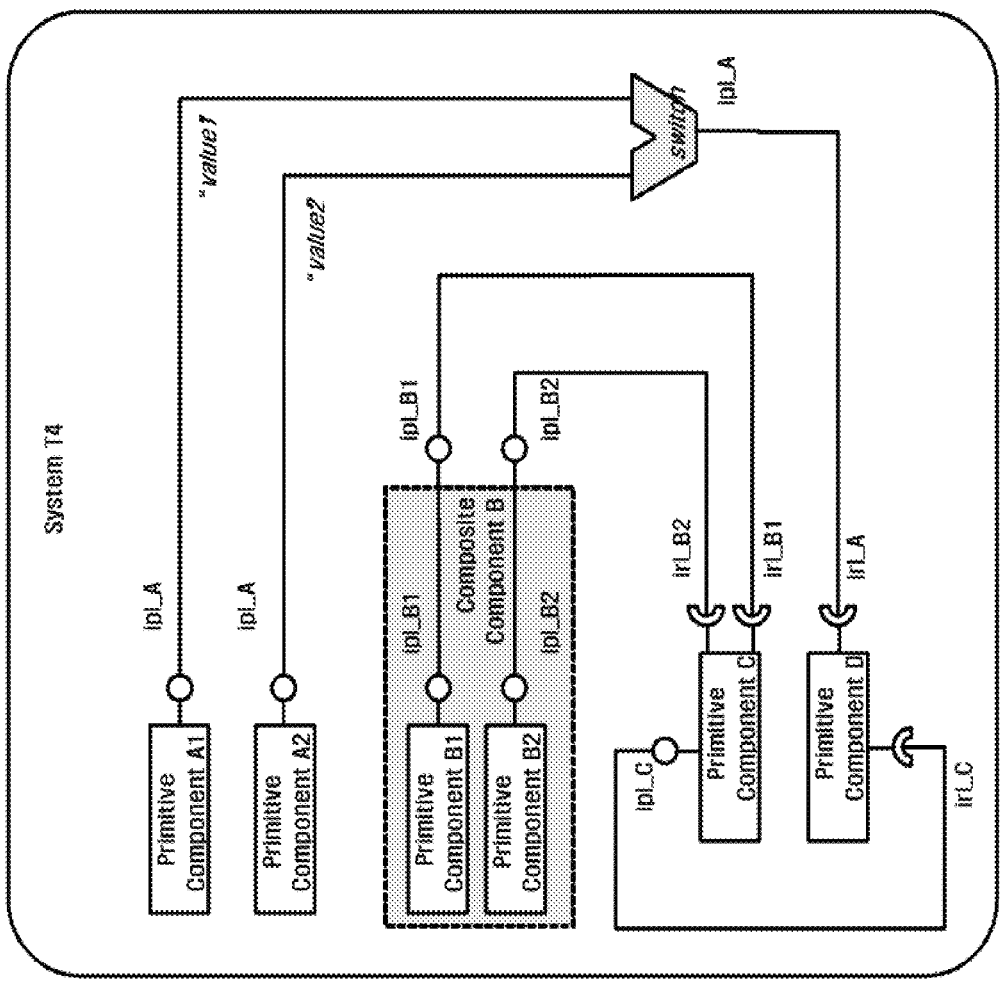
FIG. 4 is a diagram illustrating an example of applying both the variable point "OPTION" and the variable point "SWITCH."

FIG. 4 illustrates an example of applying both the variable point "OPTION" and the variable point "SWITCH."

In a component model, an example of the variable point "OPTION" may be described as follows.

```
contains {
[component] optional on [condition] ;
...
}
```

An example of the variable point "SWITCH" may be described as follows:

```
connects {
connect [interface] to switch {
        [interface] on [condition],
        [interface] on [condition], ...
} ;
}
```

As described above, the variable point "OPTION" indicates whether to include a predetermined primitive component in a composite component, and the variable point "SWITCH" indicates conditional settings for connecting the interfaces of components. Syntax blocks "contains" and "connects" are CDL elements for describing a component model, and describe the components and the connections between the interfaces of components. "[Condition]" presents a variable-value pair including a variable corresponding to variability and a setting value to which the variable may be set and which may be represented by: [Variable=Value].

FIGS. 5 through 10 illustrate examples of variability mapping.

Variable points may be described as variables in order to represent variability attributes of a component based on a component model. A plurality of components may constitute a composite component. For example, a composite component represents the variables of a plurality of components included therein.

Variable points of components may be associated with variable points of an upper-level component. This process is referred to as variability mapping. Variability mapping combines variable points of components with variable points of an upper-level component so that the variable points of the components may be set simply by using the upper-level component.

Figure 5:
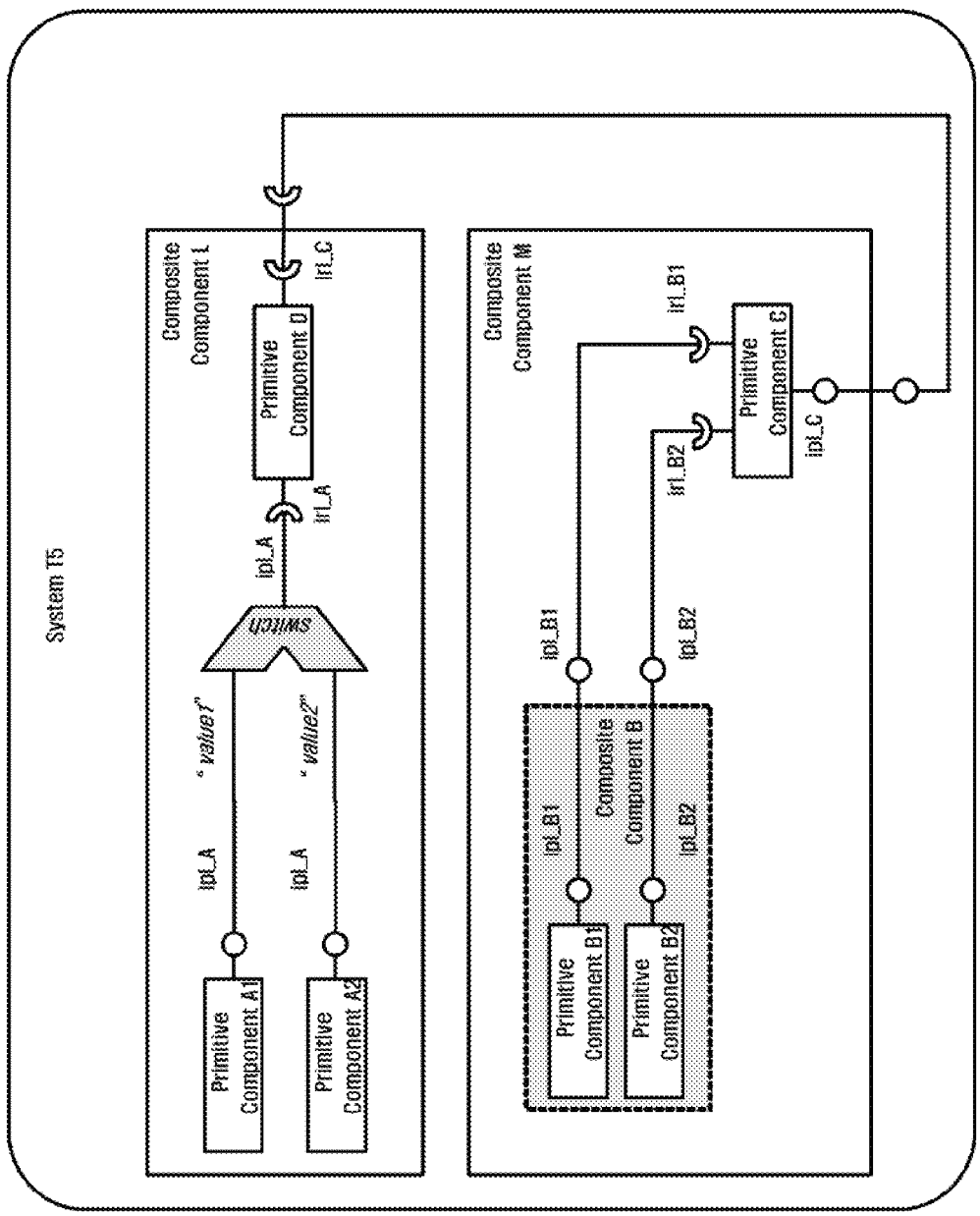
FIGS. 5 and 6 are diagrams illustrating examples of expressing variable points through variability mapping.
Figure 6:
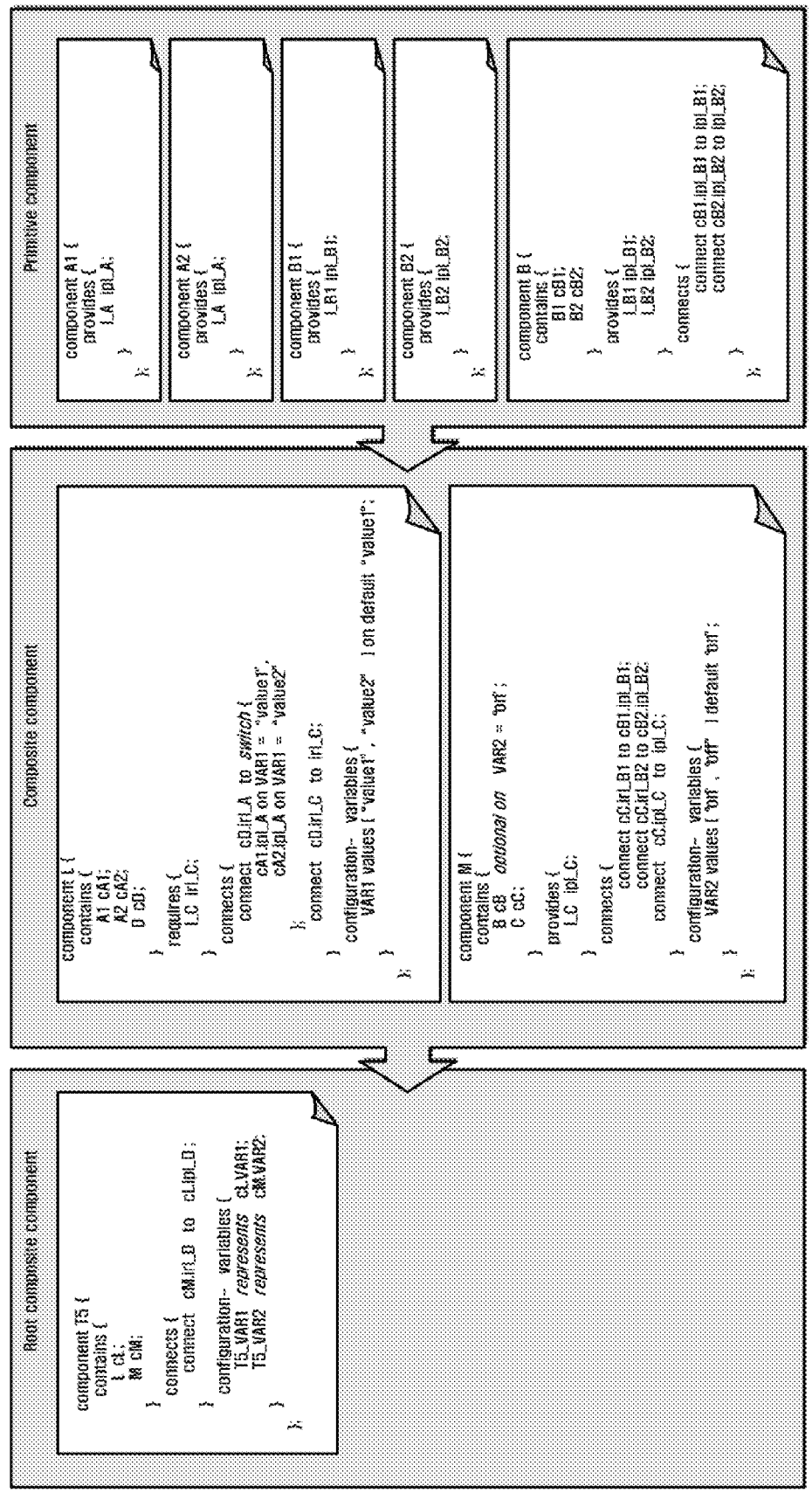

FIGS. 5 and 6 illustrate the representation of inner variable points through variability mapping, according to the hierarchy of composite components. The variability mapping may be performed in a component-based software product manager method. Referring to FIGS. 5 and 6, root composite component T5 may include two composite components, composite component L and composite component M. Each of the composite components L and M includes the variable points "SWITCH" and "OPTION." In "configuration-variables" of root composite component T5, variables VAR1 and VAR2 are mapped to variables T5_VAR1 and T5_VAR2, respectively.

Thus, the results of setting variable points in root composite component T5 may be automatically reflected in all sub-components of root composite component T5, for example, composite components L and M.

Variable points of components may be associated with variable points of an upper-level component through variability mapping. This is referred to as variability delegation. When a mapping hierarchy is established between components, the results of setting variable points of an uppermost-level component may be propagated to all sub-components of the uppermost-level component. This is referred to as configuration propagation.

An example of a component model for performing variable-to-variable variability mapping is as follows.

```
configuration-variables {
[delegation variable] represents [variable1, variable2, ...];
...
}
```

An example of a component model for performing variable-to-value variability mapping is as follows.

```
configuration-variables {
[delegation variable] values (
[value_A] represents [variable1 = value _1-1,
variable2 = value _2-1, ...],
[value_B] represents [variable1 = value _1-2,
variable2 = value _2-2, ...],
...
) ;
}
```

FIGS. 7 and 8 illustrate examples of variable-to-variable variability mapping.

Variable-to-variable variability mapping is characterized by representing variable points of components with variable points of an upper-level component. For example, referring to FIG. 7, T6_VAR1 may be set to "on" or "off" along with A_VAR1 through variable-to-variable variability mapping, even though no setting value to which T6_VAR1 is specified. In variable-to-variable variability mapping, one-to-n mapping is allowed only when n variables are each able to be set to the same value. For example, referring to FIG. 8, B_VAR1, B_VAR2, and B_VAR3 are all mapped to T7_VAR2 through variable-to-variable variability mapping because B_VAR1, B_VAR2, and B_VAR3 may each be set to "on" or "off."

FIG. 9 illustrates an example of variable-to-value variability mapping. Variable-to-value variability mapping enables one-to-n mapping by specifying individual setting values to which sub-components of a component may be respectively set, even if the sub-components cannot all be set to the same value. For example, referring to FIG. 9, variable-to-value variability mapping is performed so that sub-variables of T8_VAR1 or T8_VAR2 may each be set to different values.

Figure 10:
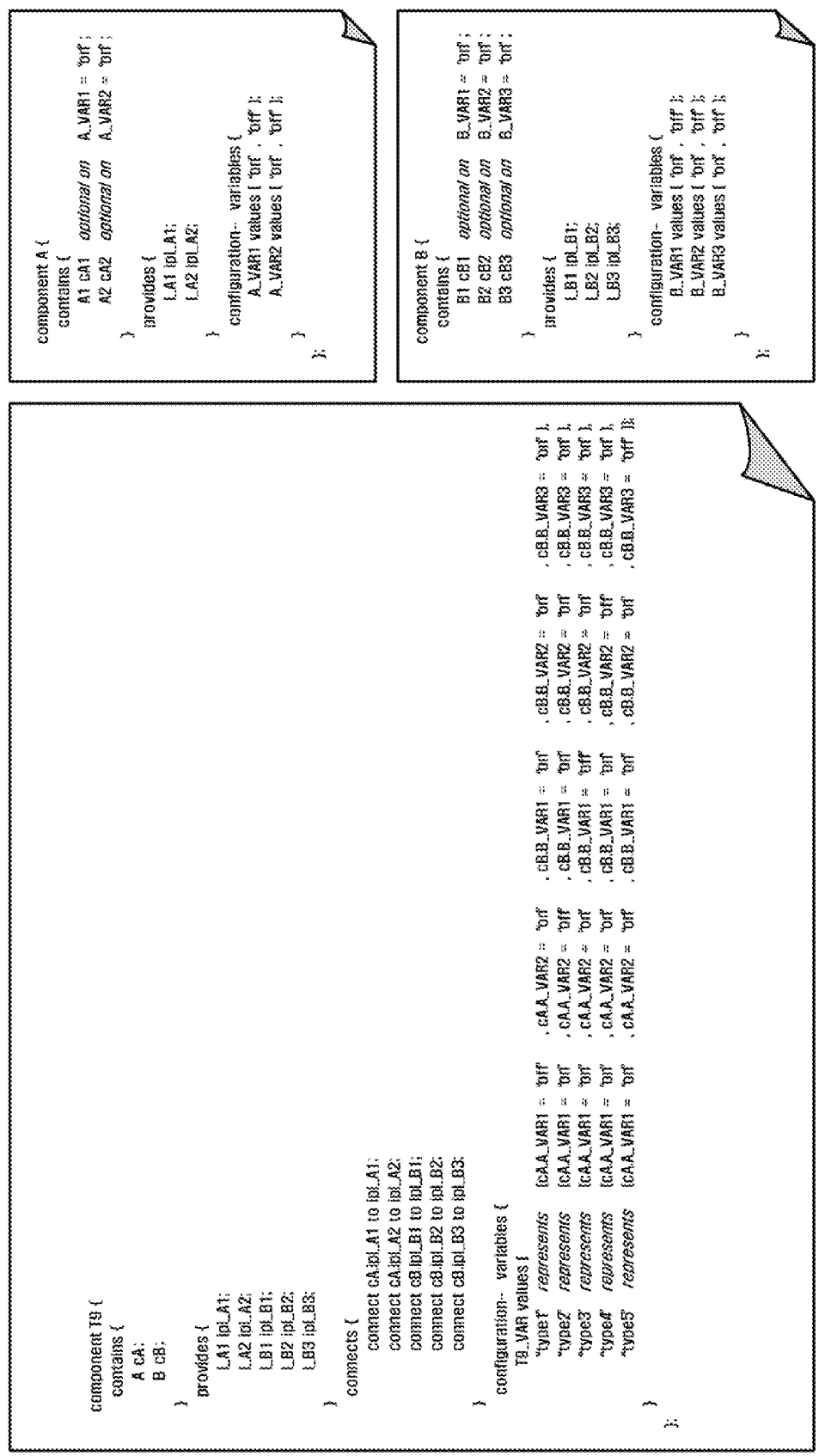
FIG. 10 is a diagram illustrating an example of variability mapping in which variable points of a plurality of low-level components are mapped to variable points of an upper-level component.

FIG. 10 illustrates an example of variability mapping in which variable points of low-level components are mapped to variable points of an upper-level component.

Figure 11:
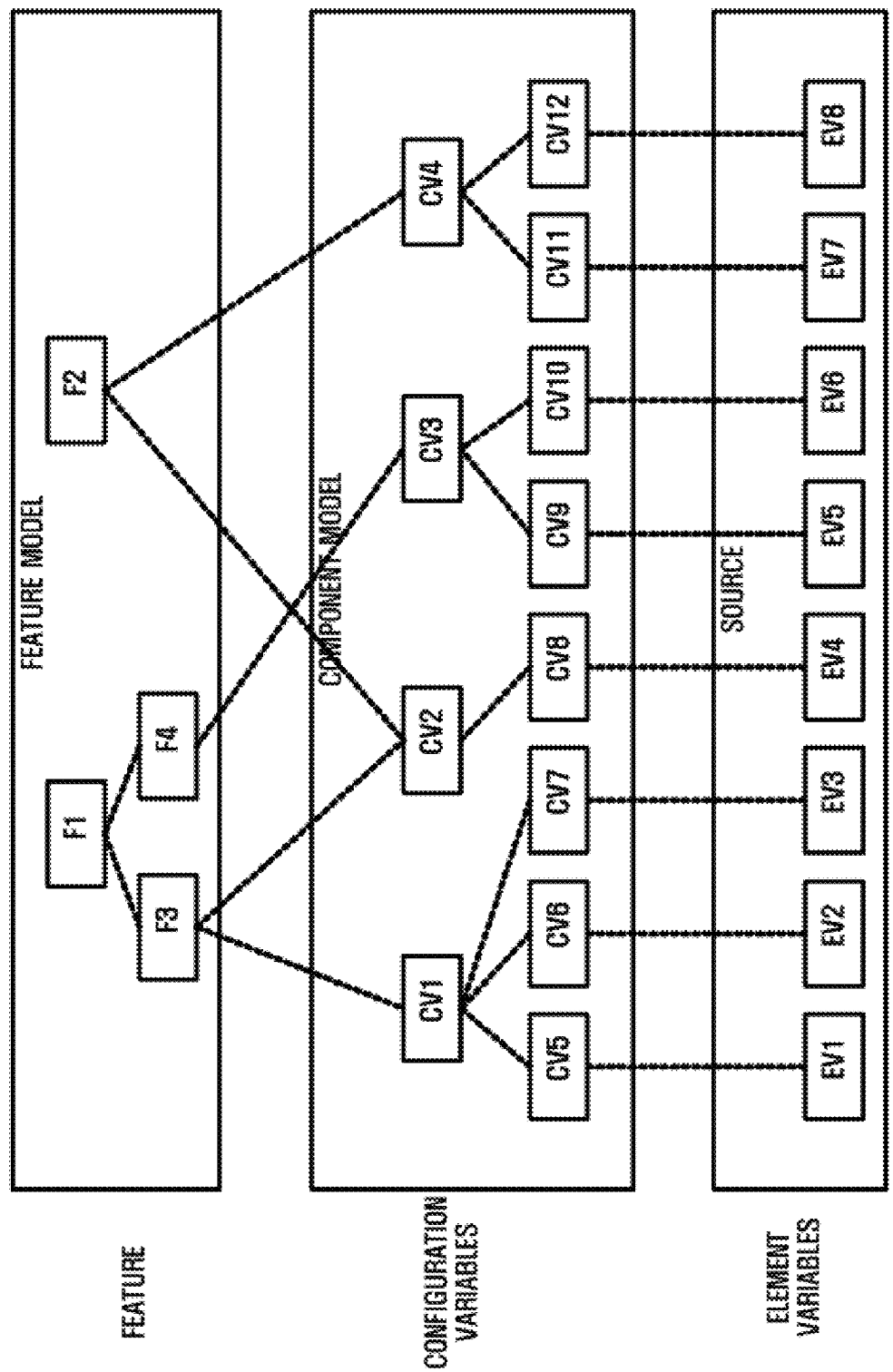
FIG. 11 is a diagram illustrating a hierarchical mapping structure of features, configuration variables, and element variables.

FIGS. 11 through 13 illustrate examples of feature mapping hierarchies.

The requirements and properties of software products are referred to as features. Features may vary from one software product to another, and thus, it is desirable to separately manage such features. Some features are mutually exclusive, and some are not. Therefore, there is the need to develop a system for classifying features into respective corresponding software product groups and describing and managing the features in units of the software product groups.

The concept of configuration variables in a component model and also the concept of features, which is more abstract than that of configuration variables, are adopted to represent various software products. These concepts enable various selections and combinations without the need to reference actual code.

Once a feature list is set, the values of configuration variables of a component model are determined. Thereafter, the values of element variables in the actual code are set. Configuration setting for a product may be performed only after the mapping relations between features and configuration variables and the mapping relations between the configuration variables and element variables, are both determined.

FIG. 11 illustrates an example of a hierarchical mapping structure including features, configuration variables, and element variables.

Examples of rules for variability mapping are as follows.

(1) Features are elements for representing the requirements and properties of a software product.

(2) Abstract features may be mapped to a less abstract feature or a set of less abstract features.

(3) Configuration variables are elements of a component model and describe the rules of processing components according to variability.

(4) A feature may be associated with a plurality of configuration variables.

(5) A configuration variable may be set to a variety of values, and thus, may be associated with a plurality of features.

(6) One-to-n mapping between configuration variables may be performed according to the variability delegation relationships between composite components and lower-level components.

(7) Element variables are the variables of a source code, and must be one-to-one mapped to configuration variables such that configuration settings may be directly propagated to element variables.

(8) An element variable may have the same name as a configuration variable associated with the element variable. If an element variable has a different name from that of a configuration variable with which the element variable is associated, information regarding the association between the element variable and the configuration variable may be additionally managed. That is, even if an element variable and a configuration variable are associated with each other, the element variable and the configuration variable may have different names, thereby improving the capability to represent configuration variables of a component model according to the meanings and the purposes of use of the configuration variables.

Features, configuration variables, and element variables are differentiated from one another in order to support variability processing in various aspects of the development of a software product.

For example, features may reflect users' or product line engineers' demands and are closely related to the analysis of such demands. Configuration variables may be related to the design of an architect that handles a component model or the design of a structure by development engineers. Element variables may be related to the implementation of a software product. Therefore, it is possible to maintain variability throughout a number of phases of the development of a software product, ranging from the most abstract elements one to the most concrete elements.

FIG. 12 illustrates an example of a list of features and indicates which of the features are applied to each product.

To support the automation of configuration setting according to the types of software products, combinations of features should be associated with respective corresponding types of product so that the feature combinations may be automatically reflected in the respective types of products.

FIG. 13 illustrates an example of a list of configuration variables that represent respective features in a component model.

Referring to FIG. 13, a plurality of configuration variables are classified into three groups, for example, a root composite component group, a first-level composite component group, and a second-level composite component group, based on their respective component levels. Each of the configuration variables should be associated with at least one feature.

Referring to FIG. 13, some configuration variables may be associated with two or more features. The configuration variables associated with two or more features may be classified into two groups. The first group may include configuration variables for designating different setting values, for example, configuration values associated with two or more features that have no mapping relationship with each other. The second group may include configuration variables for performing variability delegation, for example, configuration variables associated with two or more features that have a mapping relationship with each other.

A configuration variable that is associated with two or more features that are respectively associated with other configuration variables, corresponds to an upper-level configuration variable for representing a group of configuration variables through variability delegation. The setting values of an upper-level configuration variable are mapped to the setting values of sub-configuration variables of the upper-level configuration variable. Referring to FIG. 13, a configuration variable "GWES_LANGUAGE_SET" represents the setting values of a group of configuration variables LANGUAGE_EN_SUPPORT, LANGUAGE_CN_SUPPORT, LANGUAGE_FR_SUPPORT, and LANGUAGE_KR_SUPPORT that are associated with features F23, F24, F25, and F26, respectively. Referring to FIG. 13, "domestic," which is set for both products T1 and T4, may be interpreted as: LANGUAGE_EN_SUPPORT=on; LANGUAGE_CN_SUPPORT =off; LANGUAGE_FR_ SUPPORT=off; and LANGUAGE_KR_ SUPPORT=on.

Unlike the configuration variable "GWES_LANGUAGE_SET," a configuration variable "DMB_TYPE" is a configuration variable for containing only one of two features F2 (Support DMB signal of Satellite) and F3 (Support DMB signal of Terrestrial). Using this type of configuration variable, it is possible to reduce the number of configuration variables that need to be exclusively set.

Accordingly, a feature-to-configuration variable mapping table may be created, and the configuration of variability delegation syntax in a component model may be automatically handled.

FIGS. 14 through 16 illustrate examples of configuration settings for a product.

In a component model including FLCs, a determination may be made during the implementation of a product by which BLCs and the FLCs are respectively implemented, because components providing the same interface may be implemented in different manners. In addition, a determination may be made as to what setting values are to be applied to configuration variables included in a root composite component.

The properties of a product that are managed using a set of features are associated with configuration variables and are associated with variable points in source code.

FIG. 14 illustrates an example of a list of BLCs that implement FLCs. Referring to FIG. 14, BLCs are identified by their respective source identifiers (IDs) and names. The BLCs are associated with the names and the source locations of respective corresponding FLCs and source usability information indicating whether the BLCs may use respective source code. Source usability information may also indicate whether the development of source code is complete or under way. This enables the BLCs to use only source code that has already been developed. Referring to FIG. 14, "locked" indicates source code that is currently being developed and whose use is restricted and "unlocked" indicates source code that has already been developed and whose use is allowed.

Examples of syntactic rules of a product configuration description language for setting conditions for the generation of a product based on a root composite component of a software platform and examples for setting codes to be implemented are as follows.

```
product [product name] derived from [platform name]
{
configuration-settings
{
[configuration variable] = [value];
...
}
mappings
{
[sub primitive component] uses [BLC for sub component];
...
}
}
```

The setting values of configuration variables included in a root composite component are determined using a syntax block "configuration-settings," and BLCs, which implement the lowermost-level components, for example, primitive components, may be selected and designated using a syntax block "mappings."

FIGS. 15 and 16 illustrate examples of configuration settings of an MP3 software platform.

FIG. 15 illustrates an example of a configuration variable included in a root composite component "MP3P." The configuration variable is delegated to the extent that a product can actually be selected. Referring to FIG. 15, one of products T1 and T2 may be selected by determining the setting value of a configuration variable "DEVICE_TYPE" included in a syntax block "configuration-settings."

FIG. 16 illustrates examples of configuration variables included in a root composite component "MP3P" which are one-to-one delegated to variables of lower-level components, instead of grouping the variables of the lower-level components. Referring to FIG. 16, the setting value of a configuration variable may vary from one product to another.

Figure 17:
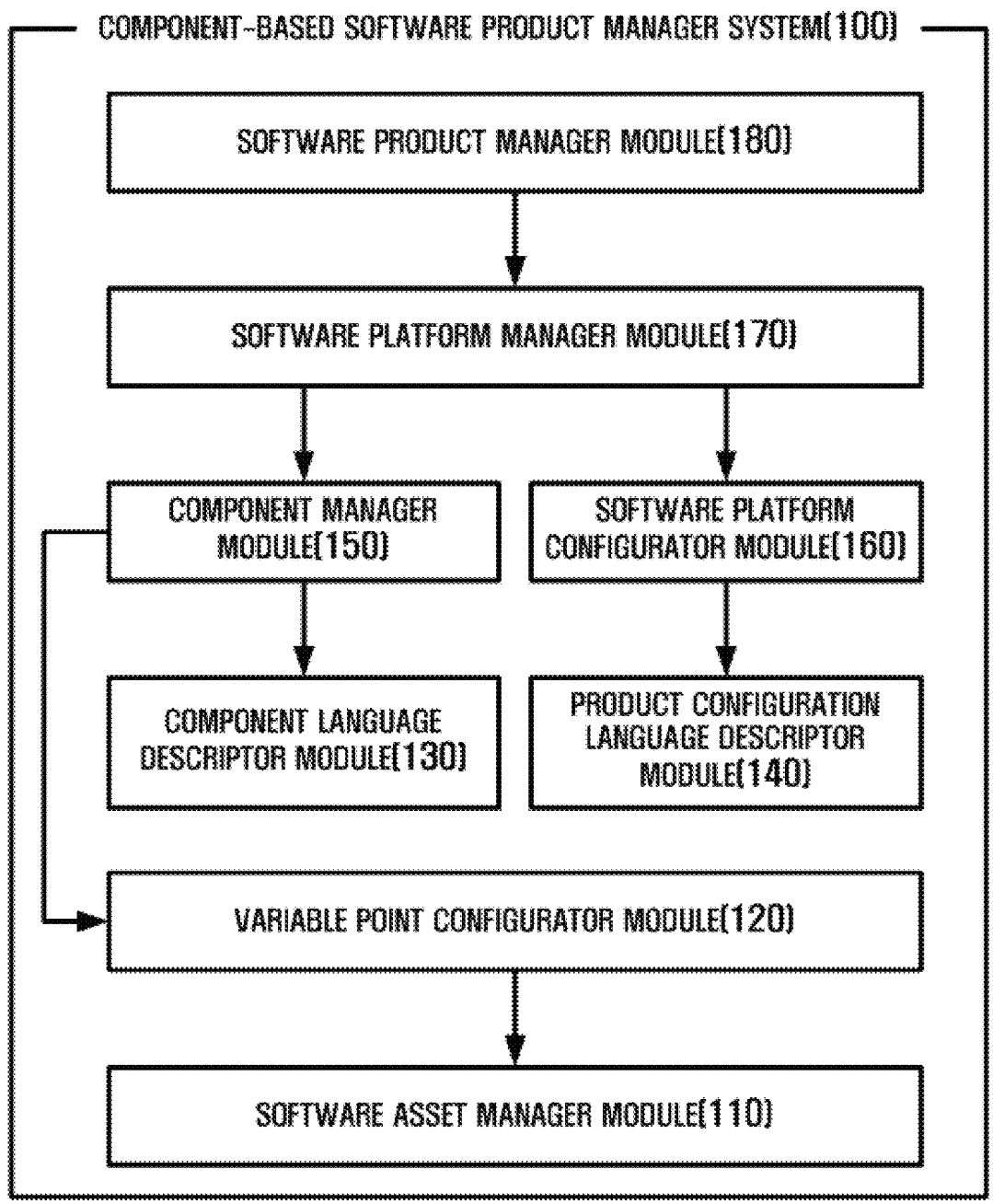
FIG. 17 is a diagram illustrating an example of a component-based software product manager system.

FIG. 17 illustrates an example of a component-based software product manager system. Referring to FIG. 17, the component-based software product manager system 100 includes a software asset manager module 110, a variable point configurator module 120, a component language descriptor module 130, a product configuration language descriptor module 140, a component manager module 150, a software platform configurator module 160, a software platform manager module 170, and a software product manager module 180.

The software asset manager module 110 manages physical elements of a software platform such as source code files and builds script files. For example, the software asset manager module 110 may track files corresponding to components to be created according to a component model. The software asset manager module 110 may manage location information of variable points by performing code list management, version management for managing information regarding code changes, and directory management for managing code location information.

When configuration setting for a product is performed, the software asset manager module 110 synchronizes element variables according to the setting of configuration variables, and provides an appropriate BLC code according to FLC-to-BLC mapping information. The FLC-to-BLC mapping information described using a product configuration description language. The variable point configurator module 120 synchronizes variable points included in a component model with variables included in an actual source code or a build script.

For this, setting values at variable point locations determined by the software asset manager module 110 may be updated, and the updated setting values may be maintained as the current setting values of variable points.

The component language descriptor module 130 handles CDL for describing a component model. The component language descriptor module 130 may include information regarding primitive components and composite components and may support syntax formats that define variables corresponding to variable points.

For example, syntax blocks that may be used to represent a composite component including variable points include:

"contains" which presents a list of sub-components of a composite component;

"provide" which presents a "provide" interface of a component or a list of "provide" interfaces provided by sub-components of a composite component;

"require" which presents a "require" interface of a component or a list of "require" interfaces of sub-components of a composite component;

"connects" which describes the association between a "require" interface and a "provide" interface; and "configuration-variables" which describes the correspondence between variables corresponding to variable points and values.

A composite component includes delegation variables for configuration variables delegated thereto by sub-components of the composite component. Configuration setting for a software product may be performed by setting delegation variables of a root composite component. That is, once delegation variables of a root composite component are set, the setting values of configuration variables that are associated with the root composite component, may be hierarchically determined.

The product configuration language descriptor module 140 describes a list of setting values of a configuration variable for respective types of products managed by the software platform configurator module 160.

Syntax formats supported by the product configuration language descriptor module 140 may be used to describe a list of products derived from a root composite component of a component model that represents a software platform. The syntax formats may also be used to establish the connections between the setting values of configuration variables and the function-level/BLCs. Examples of syntax blocks for a configuration setting for a product include:

"configuration-settings" which describes the setting values of configuration variables for a predetermined product; and "mappings" which describes the mapping relationships between components and BLCs that contain actual implementation information.

A software platform may be represented as the combination of components and configuration variables by reconfiguring the software platform into a component model.

The component manager module 150 manages and modifies a component model. For example, the component manager module 150 may track modifications, if any, to elements of a CDL, an IDL, and/or a BCDL, and may reflect the results of the tracking in a component model. Modifications to a component model may be described by the component language descriptor module 130.

The software platform configurator module 160 determines the setting values of configuration variables included in a component model, according to the settings of a feature set.

The software platform configurator module 160 handles the setting values of configuration variables included in a component model. The variable point configurator module 120 handles the setting values of element variables included in a physical code or a build script.

Product configuration setting descriptions provided by the software platform configurator module 160, like the examples illustrated in FIGS. 15 and 16, provide information regarding configuration setting-related processes performed by the software product manager module 180.

The software platform manager module 170 identifies component information corresponding to a predetermined feature in a software platform and maintains and manages feature set information and component set information. The syntax blocks "contains" and "connects" of a CDL of a root composite component include configuration variables. The configuration variables may be one-to-one or n-to-n associated with features.

When a new feature is added, a component corresponding to the new feature must be reflected in a software platform so that the software platform can be expanded. In this example, the software platform manager module 170 expands a feature set and a component set, and adds the component corresponding to the new feature to a component model, as a new component. Because modifications to a component model may be recognized and handled by the component manager module 150, physical code information, which implements components, may be stored in and handled by the software asset manager module 110.

For example, the software platform manager module 170 may provide the following functions:

(1) management of feature-to-component set mapping information;

(2) expansion of a software platform upon the addition of a new feature; and (3) management of FLC-to-BLC mapping information.

Feature-to-configuration variable mapping information, like the example illustrated in FIG. 13, and FLC-to-BLC mapping information, like the example illustrated in FIG. 14, may be managed by the software platform manager module 170.

The software product manager module 180 classifies a list of features of a software product, and maintains and manages settings information in a software platform regarding the feature set for various types of products.

For example, if there are products T1, T2, and T3, lists of features corresponding to products T1, T2, and T3, and setting value information of the features may be stored in a software platform. If product T4 is selected as a new product, a feature set appropriate for product T4 may be selected from the feature lists in the software platform, and the selected feature set and setting value information of features included in the selected feature set may be stored in the software platform.

The software product manager module 180 maintains and manages a software-product-settings-information list. If a predetermined product type is selected by a manager, the software product manager module 180 may reflect the setting values of features corresponding to the selected product type in a software platform.

Feature set information, like the example illustrated in FIG. 12, may be managed by the software product manager module 180.

The term "module", as used herein, refers to, but is not limited to, a software component, a hardware component, or a combination thereof, such as a Field Programmable Gate Array (FPGA) or Application Specific Integrated Circuit (ASIC), which performs certain tasks. A module may be configured to reside on the addressable storage medium and be configured to execute on one or more processors. For example, a module may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. The modules may be configured to be executed and/or controlled by a processor.

Figure 18:
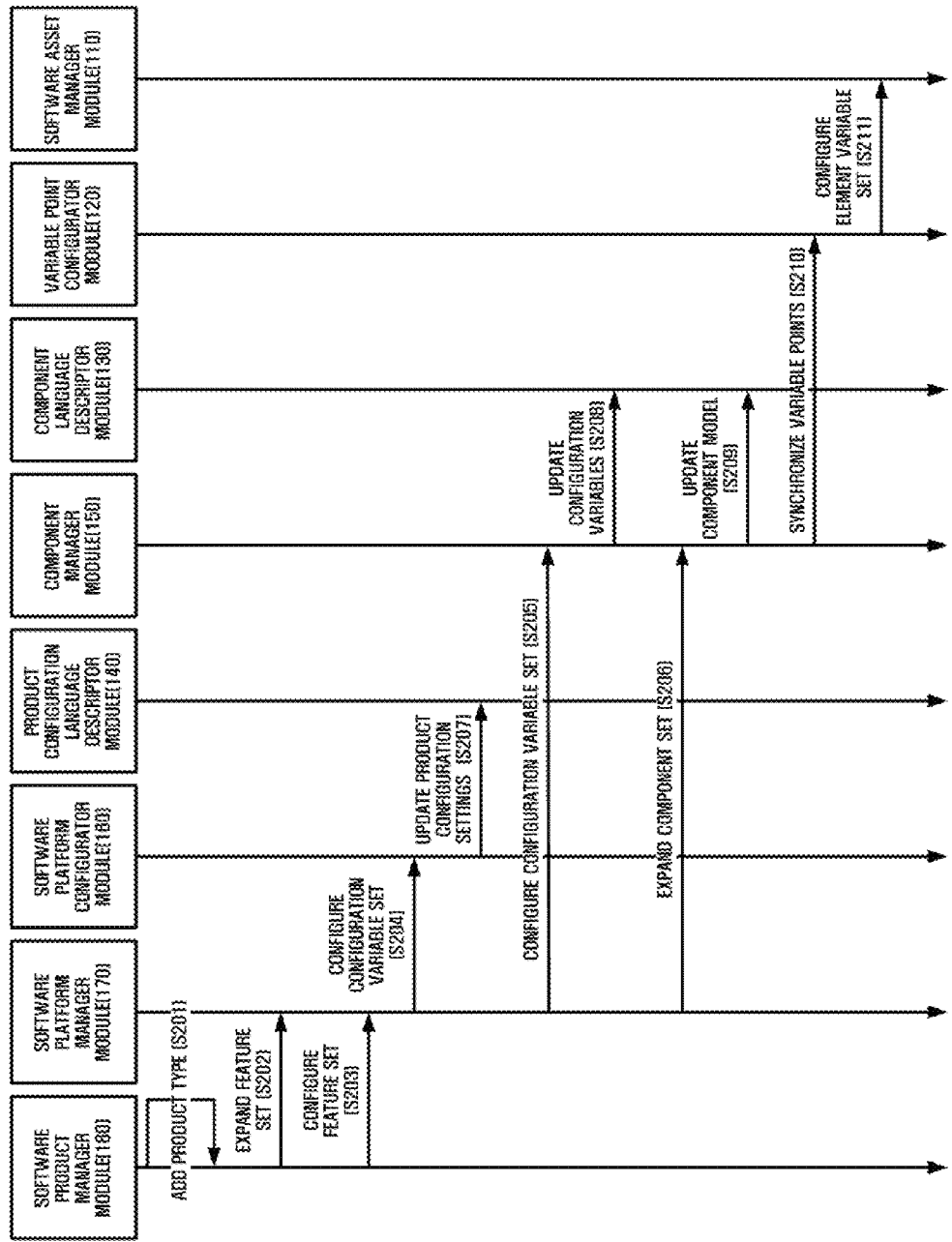
FIG. 18 is a diagram illustrating an example of the establishment of a software platform architecture upon the addition of a new product.

FIG. 18 illustrates an example of a method for establishing a software platform architecture upon the addition of a new product. Referring to FIGS. 17 and 18, when a new product is added, the software product manager module 180 adds the product type of the new product in (S201). In order to combine features of the new product, the software product manager module 180 determines whether features corresponding to the new product exist in a feature list. If the features corresponding to the new product do not exist in the feature list, the software product manager module 180 expands a feature set in (S202). Next, the software product manager module 180 may configure a feature set for the new product by combining features in an existing feature table and new feature items in (S203).

The software platform manager module 170 configures a configuration variable set by updating a feature-to-configuration variable mapping table according to modifications to the feature set managed by the software product manager module 180 in (S204). A new configuration variable to be included in a component model should be added for new features and mapped to the new features. Also, different setting values to which the new configuration variable can be set must be defined for different types of products. Thus, the software platform manager module 170 configures a configuration variable set for components, if any, corresponding to the new product in (S205). If the components corresponding to the new product do not exist, the software platform manager module 170 expands a component set in (S206).

The software platform configurator module 160 updates configuration settings regarding the new product using an updated configuration variable table provided by the software platform manager module 170 in (S207). Then, the software platform configurator module 160 performs syntax processing using the product configuration language descriptor module 140 in order to manage information that determines what configuration variable setting values are mapped to FLCs and/or BLC.

The component manager module 150 determines what components are applied based on configuration settings and in what structure components are mapped to configuration variables in a component model, based on an updated configuration variable table. In (S208), the component manager module 150 updates the values of the configuration variables according to the results of the determination. In (S209), the component manager module 150 updates the component model, and performs syntax processing using the component language descriptor module 130. Also, the component manager module 150 synchronizes variable points in (S210).

The variable point configurator module 120 determines the structure and the locations in an actual code element and in what structure the element variables are mapped, and manages the element variables. For this, information managed by the variable point configurator module 120 may be synchronized with information managed by the software asset manager module 110. Accordingly, the variable point configurator module 120 configures an element variable set in (S211).

The software asset manager module 110 determines the locations of the element variables and thus prepares for configuration delegation. The software asset manager module 110 may determine the locations of the element variables by generating a new template code.

Figure 19:
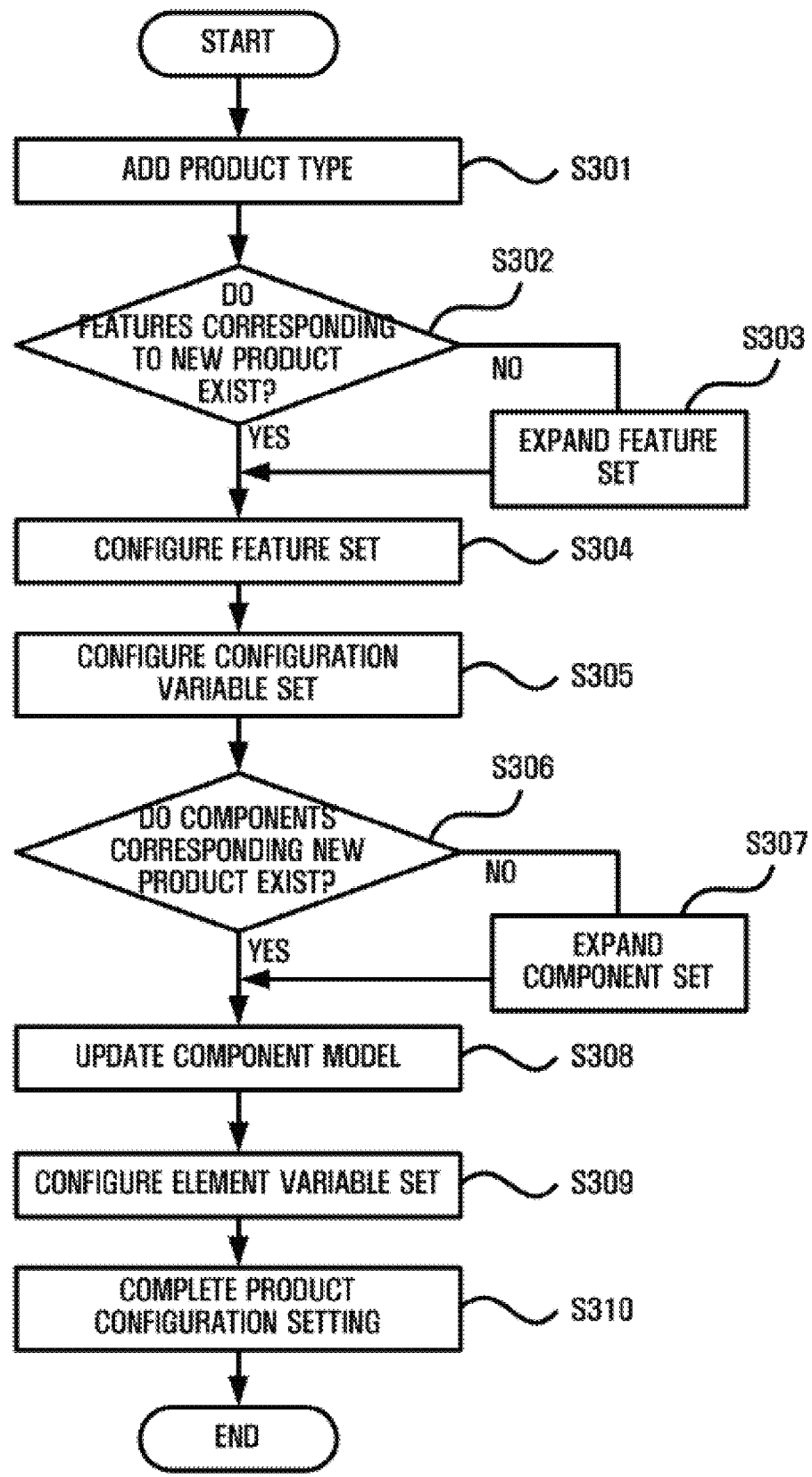
FIG. 19 is a flowchart illustrating an example of a method of a software platform architecture upon the addition of a new product.

FIG. 19 illustrates an example method of a software platform architecture as performed in a component-based software product manager. Referring to FIG. 19, when a new product is added, a product type corresponding to the new product is added in (S301). To configure a feature set for the new product, in (S302), it is determined whether one or more features corresponding to the new product exist.

If features corresponding to the new product do not exist, a feature set is expanded in (S303). In (S304), a feature set for the new product is configured by combining features in an existing feature table and new feature items.

In (S305), a configuration variable set is configured by updating a feature-to-configuration variable mapping table. A new configuration variable to be included in a component model should be added for new features and mapped to the new features and different setting values to which the new configuration variable may be set, and also should be defined for different types of products. Accordingly, a configuration variable set is also configured for components, if any, corresponding to the new product. For this, it is determined whether the components corresponding to the new product exist in (S306).

If the components corresponding to the new product do not exist, a component set is expanded in (S307).

If the components corresponding to the new product exist, a component model is updated in (S308).

In (S309), an element variable set is configured based on the updated component model, in order to determine to what locations in an actual code element and in what structure element variables are mapped, and to manage the element variables.

Once the locations of the element variables are determined and the configuration delegation is prepared for, in (S310) configuration setting for the new product is completed.

Figure 20:
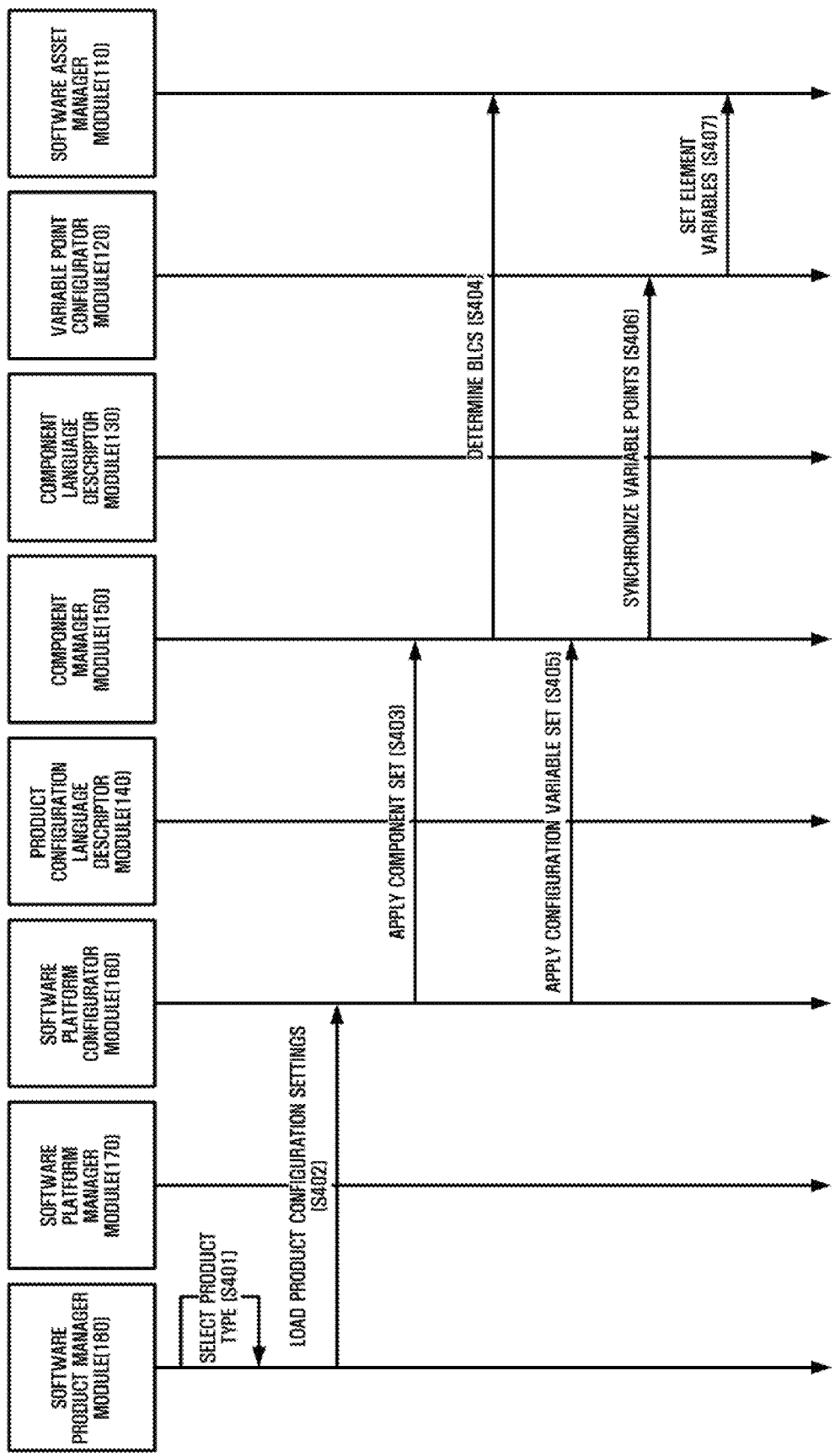
FIG. 20 is a diagram illustrating an example of a process for selecting a product having a predetermined feature set from a software platform and the application of configuration settings to the product.

FIG. 20 illustrates an example of a process for selecting a product having a predetermined feature set from a software platform and the application of configuration settings to the product. The selection process may be performed in the component-based software product manager method.

Referring to FIGS. 17 and 20, the software product manager module 180 selects a product in (S401). In (S402), the software product manager module 180 loads product configuration description language information managed by the software platform configurator module 160, based on the selected product.

The software platform configurator module 160 applies a component mapping set in (S403), and in (S404), determines BLCs to be associated with primitive components in a component model with the aid of the component manager module 150.

The software platform configurator module 160 applies a configuration variable set in (S405). In (S406), the software platform configurator module 160 synchronizes variable points by designating predetermined setting values for configuration variables in the component model with the aid of the component manager module 150.

In (S407), the variable point configurator module 120 substitutes the setting values of element variables into the respective configuration variables with the aid of the software asset manager module 110.

Accordingly, code setting and variable setting for the development of a software product are completed. Thus, the production of products may be readily performed, and the modification and additional development of products may also be performed.

Figure 21:
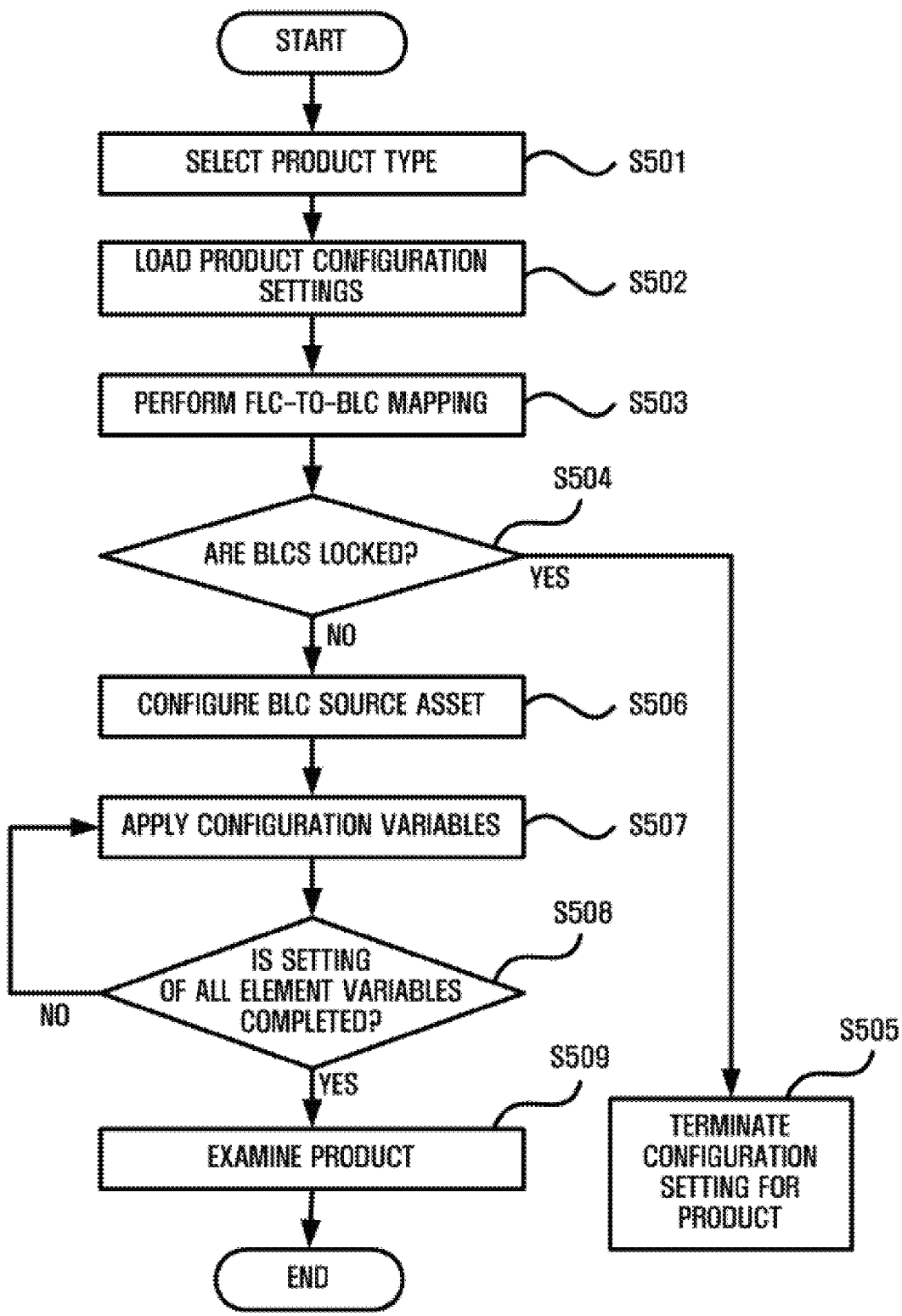
FIG. 21 is a flowchart illustrating an example of a method for selecting a product having a predetermined feature set from a software platform, and the application of configuration settings to the product.

FIG. 21 illustrates an example of selecting a product having a predetermined feature set from a software platform and the application of configuration settings to the product. Referring to FIG. 21, in (S501) a product is selected. In (S502), configuration settings regarding the selected product are loaded.

In (S503), function-level components are mapped to BLCs according to the loaded configuration settings. In (S504), it is determined whether the BLCs are locked. Because the use of locked BLCs is restricted, in (S505) configuration setting for the selected product is terminated if the BLCs are locked.

In contrast, if the BLCs are unlocked components, in (S506) a BLC asset is configured, and in (S507), the configuration variables are applied to the BLC asset.

Thereafter, in (S508) it is determined whether the setting of all element variables is completed. If the setting of all element variables is yet to be completed, the selected product is examined in (S509).

Figure 22:
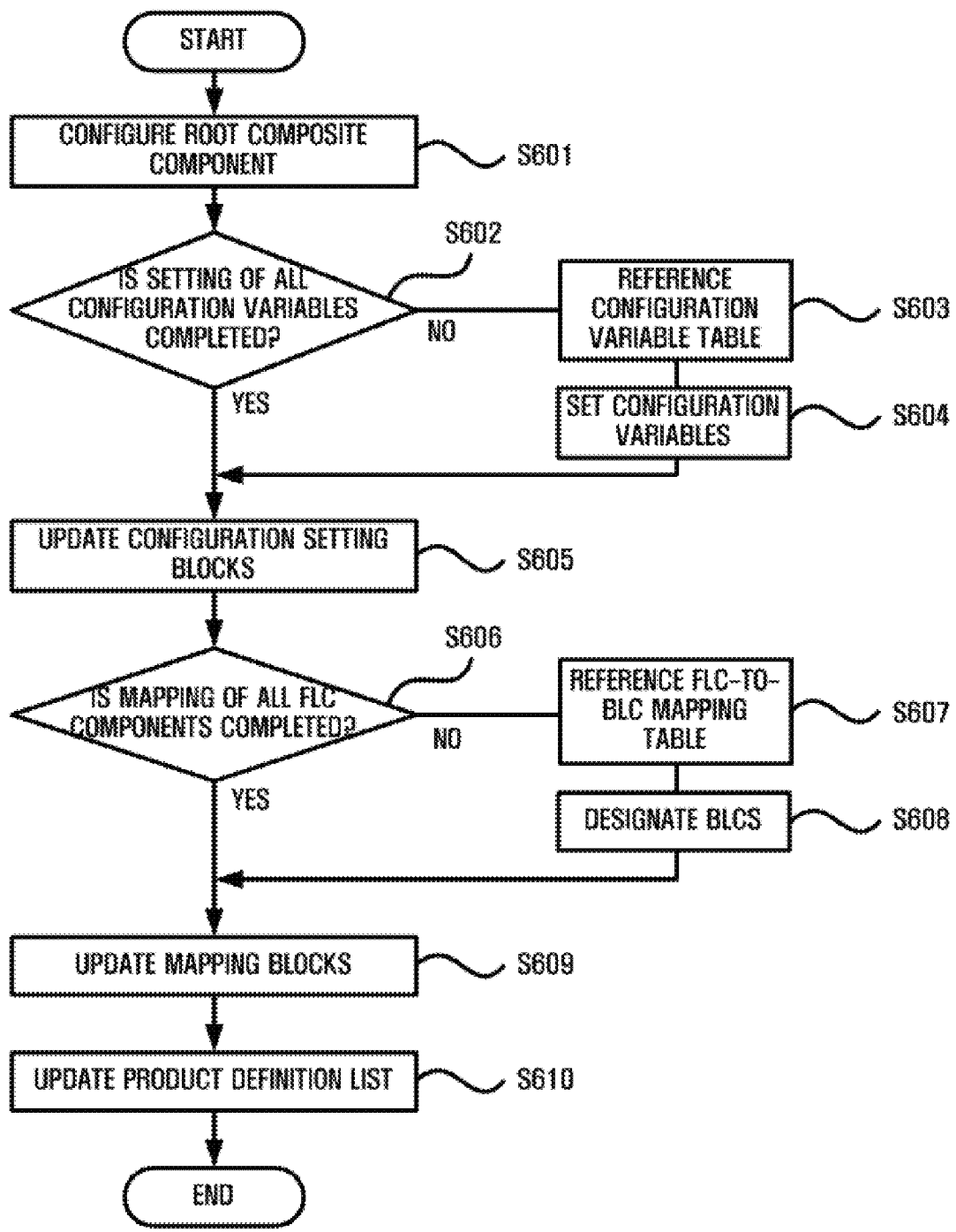
FIG. 22 is a flowchart illustrating an example of a method for creating a product configuration description language according to the features of a software product.

FIG. 22 illustrates an example of a method for creating a product configuration description language according to the features of a software product. The creating may be performed in the component-based software product manager method. Referring to FIG. 22, in (S601), a syntax "derived from" is created by associating a root composite component of a component model that represents software platform architecture.

In (S602), a determination is made as to whether setting values have already been designated for all configuration variables included in the root composite component. If setting values have not yet been designated for some of the configuration variables, in (S604) setting values are designated to a predetermined product by referencing a configuration variable table in (S603).

Once the setting of all the configuration variables is completed, a syntax block "configuration-settings" is created/updated and then stored in (S605).

Thereafter, in (S606) it is determined whether FLCs of all primitive components included in the root composite component have already been mapped to respective corresponding BLCs. If there are some primitive components having FLCs that have not yet been mapped to BLCs, BLCs are designated to the predetermined product in (S608) by referencing a FLC-to-BLC mapping table in (S607).

Once the mapping of the FLCs of all the primitive components to BLCs is completed, syntax block "mappings" is created and stored in (S609). Thereafter, a product configuration description language created in the above-mentioned manner is added to a list in (S610).

Accordingly, various product configuration description languages for different types of products may be created and managed.

Figure 23:
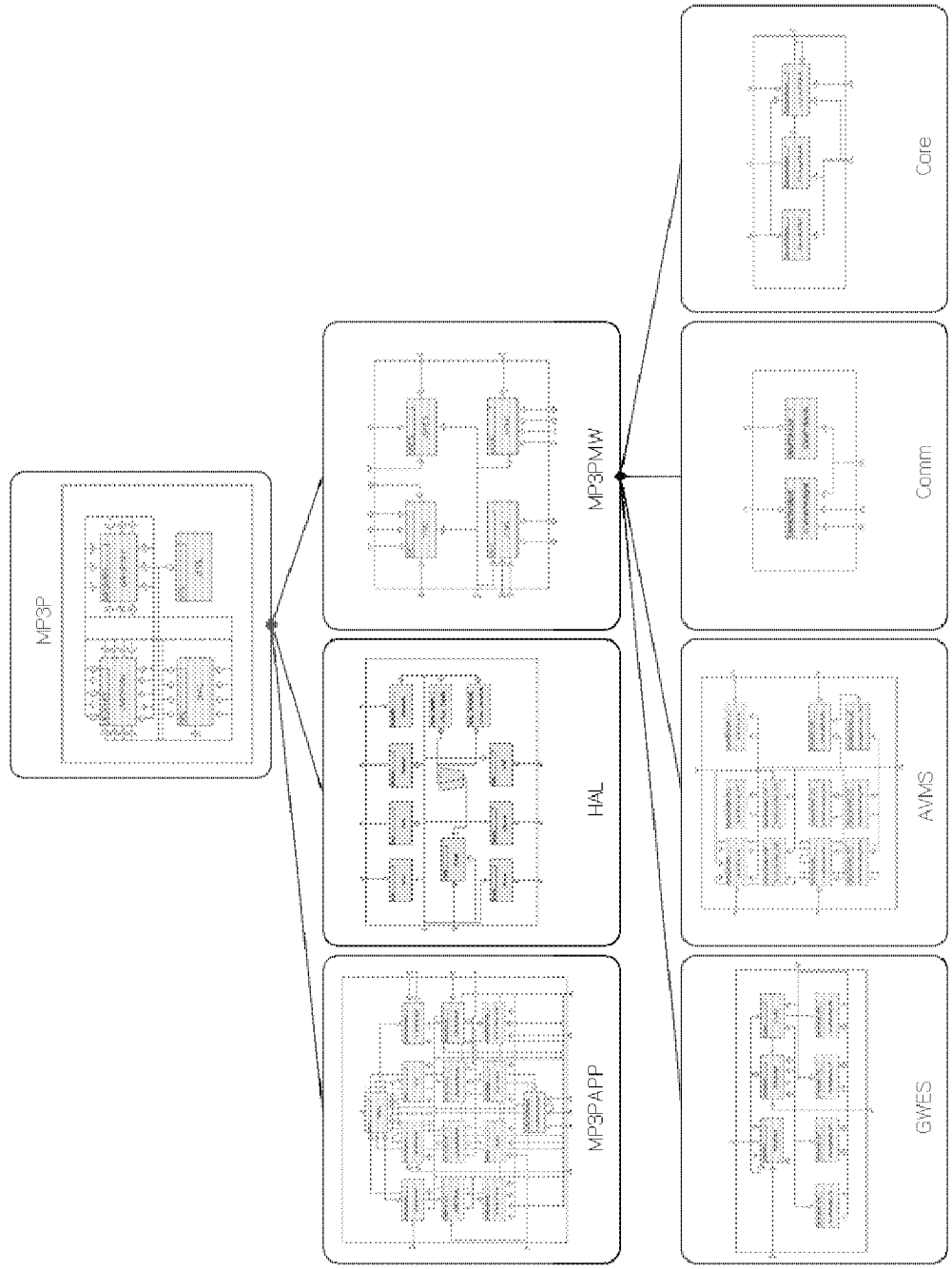
FIG. 23 is a diagram illustrating an example of an MP3 player software platform architecture.

FIG. 23 illustrates an example of an MP3 player software platform architecture constituted by various component combinations. Referring to FIG. 23, a composite component may include a number of sub-components thereof and variable points such as "OPTION" or "SWITCH."

FIG. 24 illustrates an example of a configuration variable analysis table. The configuration variable analysis table is used for describing a software platform architecture using a component model and thus for enabling the production of individual software products simply through the setting of configuration variables for an MP3 player software platform. Referring to FIG. 24, once a feature-to-configuration variable mapping table is configured, it is possible to determine the structure of a software product using a feature list.

Figure 25:
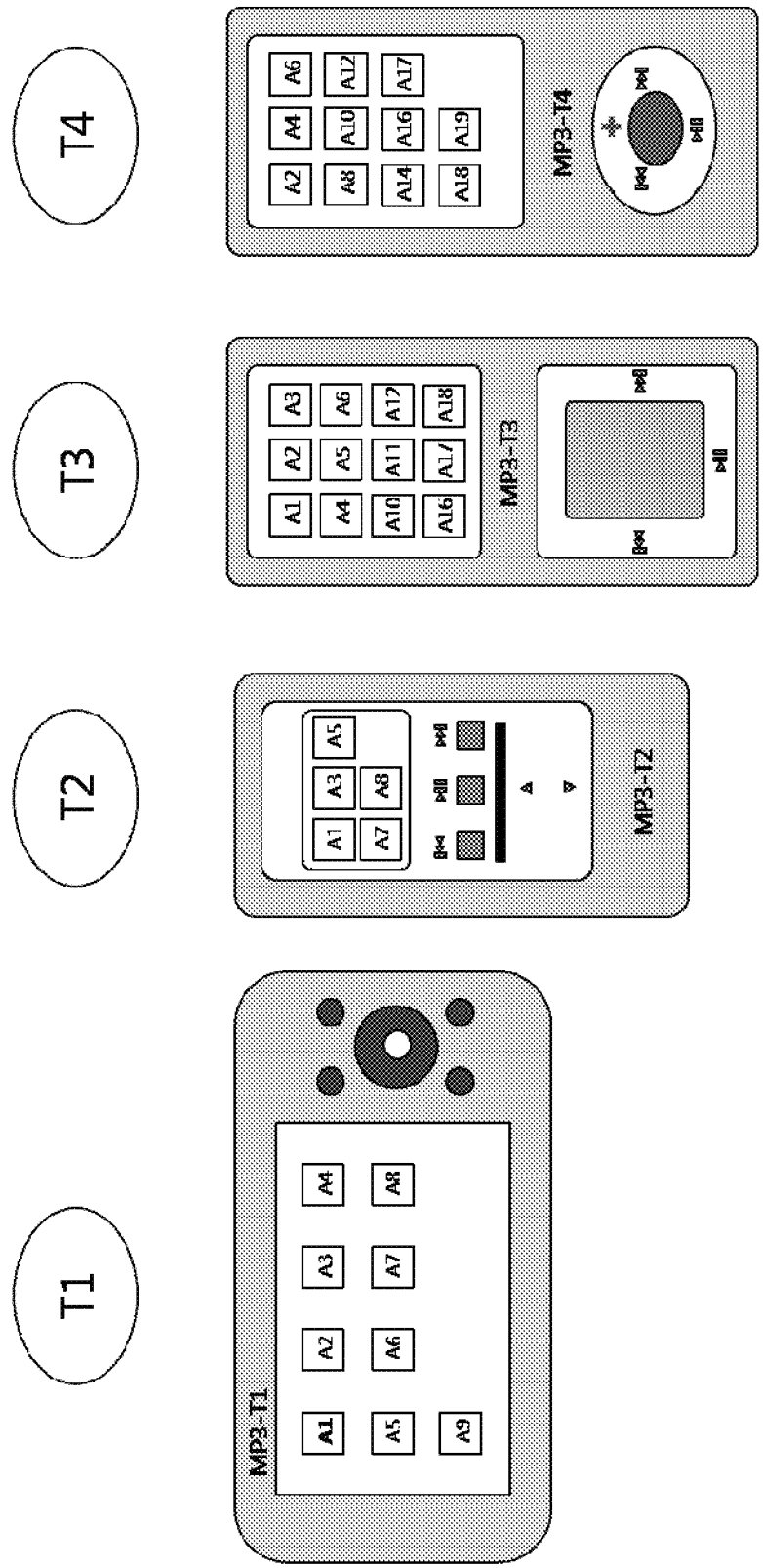
FIG. 25 is a list of various examples of types of MP3 players equipped with different application components.

FIG. 25 illustrates an example of a list of various types of MP3 players equipped with different application components. Even though not illustrated in FIG. 25, detailed configuration information of software products such as HAL or individual codec-related component information may also be managed for various types of products.

Because conventional UML rules are insufficient to properly represent variable points, and they do not take component-based processing into consideration, the conventional UML rules fail to meet the ultimate goal of software product lines (SPLs), for example, failing to suggest techniques for supporting the development of software products through composition and configuration.

In order to address the above-mentioned problems, the software product manager system and method described herein may be used. SPL may be effectively operated using a Component-Based Software Development (CBSD)-based software development method.

The software product manager system and method feature management, but also feature the setting of configuration variables. The management and the setting may be effectively performed using a component model.

The software product manager system and method in which a software platform is managed using a component model and an SPL may be effectively operated using the component model.

The system and method described herein manage software architecture by combining and associating components with one another while managing a large-scale software asset in units of the components. Accordingly, configuration information may be consistently controlled using a component model, and features and implementation information may be associated, thereby realizing a management system that can integrate a number of phases of the development of a software product.

Various software products for electronic appliances include common components that are shared there between and variable components that are not commonly shared and are instead exclusive to individual products. Therefore, software platform architecture should be configured as a system capable of creating nearly all types of software products. The system and method described herein improve inter-enterprise cooperation and the reusability of software products.

Accordingly, it is possible to increase software development productivity and efficiency by managing a software platform in a product line architecture-based manner using existing software design information provided by major software design tools.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A component-based software product manager system, the system comprising:
   a processor;
   a software product manager module configured to manage a list of features representing the properties of a software product;
   a software platform manager module configured to manage a list of components corresponding to the features of the software product;
   a software platform configurator module configured to set configuration variables of the list of components to predetermined setting values by mapping the list of features to the configuration variables, wherein the configuration variables describe rules for processing components according to variability, multiple features are mapped to a single configuration variable, and the configuration variables are one-to-n amped to each other according to variability, wherein n is an integer greater than zero;
   a software asset manager module configured to map element variables to the lower-level components, and manage physical elements;
   a component manager module configured to maintain a component model and manage modifications, if any, to the component model;
   a component language descriptor module configured to handle a component description language that describes configuration information of the components and the definitions of variables corresponding to variable points; and
   a variable point configurator module configured to synchronize the variable points with the element variables, wherein the variable points comprise "OPTION" for determining whether to include a component and "SWITCH" for selecting an interface.

2. The component-based software product manager system of claim 1, further comprising a product configuration language descriptor module configured to describe the predetermined setting values to which the configuration variables are respectively set by the software platform configurator module.

3. The component-based software product manager system of claim 1, wherein:
   the components comprise function-level components (FLCs) and build-level components (BLCs);
   the software platform manager module is further configured to manage information regarding associations between the FLCs and the BLCs; and
   the software asset manager module is further configured to provide the BLCs.

4. The component-based software product manager system of claim 1, wherein the element variables are one-to-one mapped to the lowest level of the configuration variables so that configuration propagation can be performed.

5. The component-based software product manager system of claim 1, wherein the configuration variables are classified into high-level configuration variables and low-level configuration variables by variability delegation.

6. The component-based software product manager system of claim 5, wherein the high-level configuration variables are one-to-n mapped to the low-level configuration variables, based on variability delegation relationships between the components.

* * * * *